US010455012B2

(12) United States Patent
Abdallah

(10) Patent No.: US 10,455,012 B2
(45) Date of Patent: Oct. 22, 2019

(54) ROUTES DISCOVERY IN WIRELESS NETWORKS WITH DIRECTIONAL TRANSMISSIONS

(71) Applicant: SONY CORPORATION, Tokyo (JP)

(72) Inventor: Ramy Abdallah, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 100 days.

(21) Appl. No.: 15/430,151

(22) Filed: Feb. 10, 2017

(65) Prior Publication Data

US 2018/0234907 A1 Aug. 16, 2018

(51) Int. Cl.

| H04L 29/08 | (2006.01) |
|---|---|
| H04W 48/16 | (2009.01) |
| H04B 7/0413 | (2017.01) |
| H04W 40/24 | (2009.01) |
| H04L 12/707 | (2013.01) |
| H04W 84/12 | (2009.01) |
| H04W 84/18 | (2009.01) |

(52) U.S. Cl.
CPC ......... *H04L 67/104* (2013.01); *H04B 7/0413* (2013.01); *H04L 45/24* (2013.01); *H04W 40/24* (2013.01); *H04W 48/16* (2013.01); H04W 84/12 (2013.01); H04W 84/18 (2013.01)

(58) Field of Classification Search
CPC combination set(s) only.
See application file for complete search history.

(56) References Cited

U.S. PATENT DOCUMENTS

| 8,578,054 | B2 | 11/2013 | Thubert et al. | |
|---|---|---|---|---|
| 8,861,398 | B2 | 10/2014 | Bhatti et al. | |
| 9,930,561 | B2* | 3/2018 | Boodannavar | .... H04W 28/0231 |
| 2004/0029553 | A1 | 2/2004 | Cain | |
| 2007/0064950 | A1* | 3/2007 | Suzuki | ..................... H04L 45/26 380/270 |
| 2007/0071127 | A1* | 3/2007 | Gore | ................... H04L 25/0226 375/267 |
| 2009/0228575 | A1* | 9/2009 | Thubert | ................ H04L 45/128 709/220 |
| 2010/0014444 | A1* | 1/2010 | Ghanadan | ............. H04W 40/26 370/310 |
| 2011/0176416 | A1 | 7/2011 | Bhatti et al. | |

(Continued)

OTHER PUBLICATIONS

European Patent Office (EPO), International Search Report and Written Opinion dated Dec. 12, 2017, PCT international application No. PCT/US2017/048685, pp. 1-11, with claims searched, pp. 12-16.

(Continued)

*Primary Examiner* — Mandish K Randhawa
(74) *Attorney, Agent, or Firm* — O'Banion & Ritchey LLP; John P. O'Banion

(57) ABSTRACT

A method and apparatus for routing data through independent routes substantially between a source station and a destination station of a mesh network. The routes are discovered in a non-sequential, pseudo-simultaneous manner from a source station (STA) to a destination station (STA). An extended routing request (RREQ) and routing reply (RREP) are utilized which provide a primary and secondary flag indication, which is utilized in combination with advanced programming for setting path cost metrics to assure independence of primary and secondary routes.

16 Claims, 20 Drawing Sheets

(56) References Cited

U.S. PATENT DOCUMENTS

2014/0269292 A1* 9/2014 Kalkunte .............. H04L 45/123
370/232
2018/0052216 A1* 2/2018 Vered ........................ G01S 3/22

OTHER PUBLICATIONS

Zangenh, V. et al., "New Multipath Node-Disjoint Routing Based on AODV Protocol", World Academy of Science, Engineering and Technology, International Journal of Electrical, Computer, Energetic, Electronic and Communication Engineering vol. 5, No. 4, pp. 555-558, 2011.

Wu, Jie, "An Extended Dynamic Source Routing Scheme in Ad Hoc Wireless Networks", Department of Computer Science and Engineering, Florida Atlantic University, Boca Raton, FL, 33431, pp. 1-18, 2003.

* cited by examiner

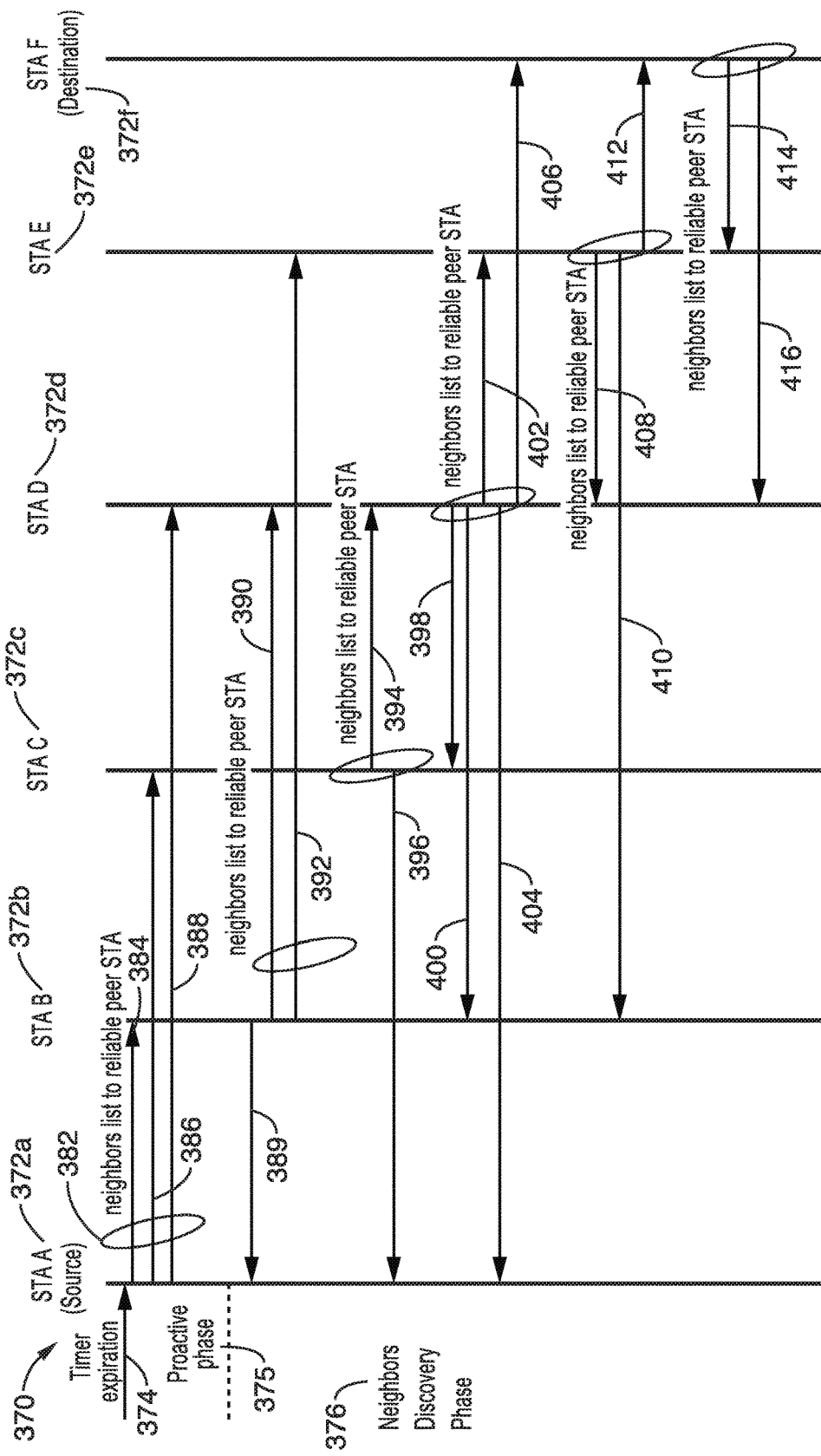

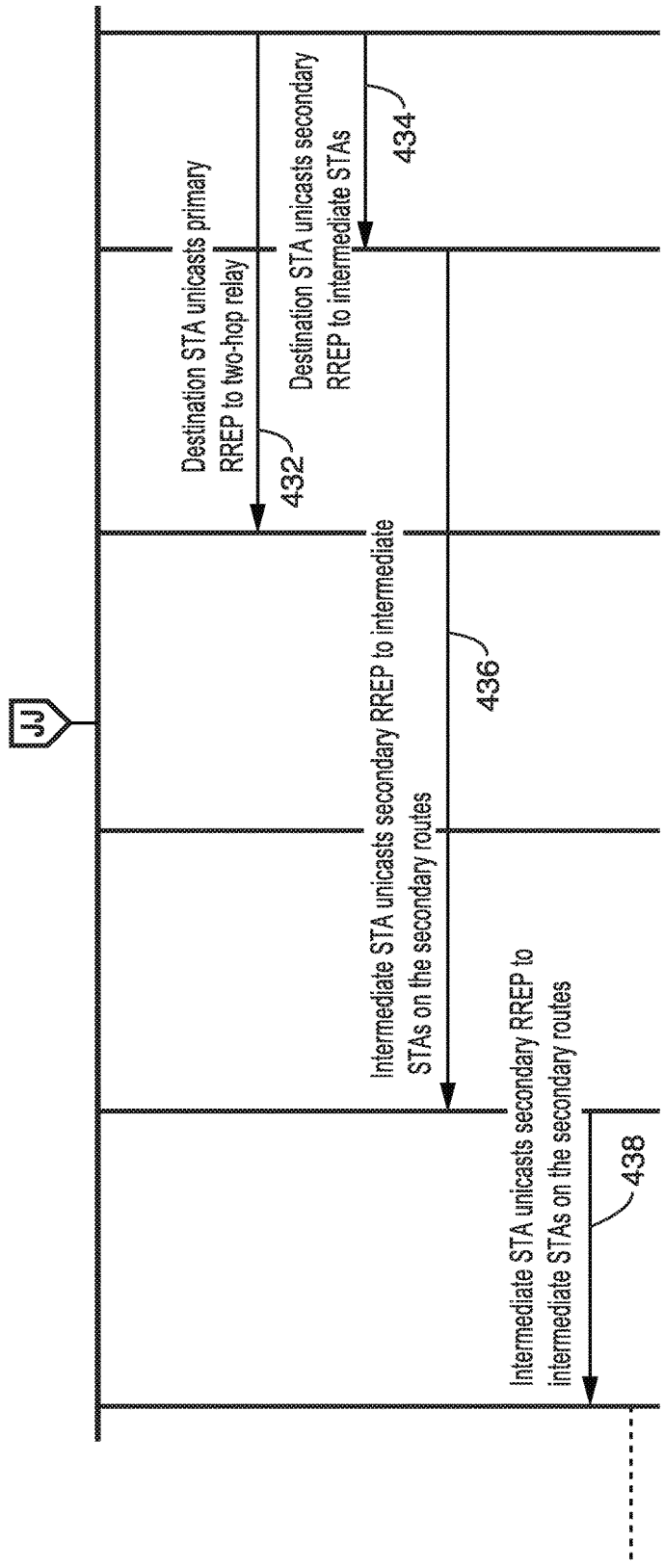
FIG. 15C Primary and secondary routes selection for the example of a network topology explained in this embodiment

ROUTES DISCOVERY IN WIRELESS NETWORKS WITH DIRECTIONAL TRANSMISSIONS

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to message routing in ad-hoc or mesh networks, and more particularly to improved routing path discovery in ad-hoc and mesh networks.

2. Background Discussion

In decentralized networks, such as ad-hoc or mesh networks, data is routed from a source station (STA) to a destination STA in multiple hops (traversing multiple nodes of the network) through intermediate relays. In mmWave networks, data is routed to overcome range limitations at very high frequencies.

In some cases, data can be transmitted over two paths between source STA and destination STA at the same time; such as to mitigate blockage in one of the paths or to transmit multiple data streams from a MIMO capable source STA to a MIMO capable destination STA with the relays either MIMO capable or not.

AODV is a routing protocol to establish End-End communication route through multiple hop relaying. With AODV, the route from source STA to destination STA is discovered by the following procedure: (a) Source STA transmits RREQ frames in multicast fashion; (b) Intermediate STAs propagate the RREQ frames in a multicast fashion; (c) Destination STA replies back with RREP frame toward the source STA in unicast fashion (and remembers the next-hop STA); (d) Intermediate STAs propagate the RREP toward the source STA in unicast fashion (and remember the next-hop STAs); (e) Upon reception of the RREP frame, the source STA remembers the next-hop STA, and starts data communication using the route procedure by the RREQ/RREP handshaking. However, these communication protocols do not provide for rapid route discovery or use of multiple routing paths.

Accordingly, a need exists for improved discovery of multiple routes (paths) in mesh networks with directional transmissions. The present disclosure fulfills those needs and overcomes shortcomings of previous approaches.

BRIEF SUMMARY

Fast discovery of multiple routes (paths) in mmWave mesh networks is disclosed in a method and apparatus while insuring independence of the multiple paths by the intermediate STA.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 15A through FIG. 15C is a message flow diagram showing the stages of neighbor list exchange, and discovering the best primary and secondary routes pseudo-simultaneously, according to an embodiment of the present disclosure.

DETAILED DESCRIPTION

1. Introduction 1.1. Definitions

Unless otherwise provided herein, all terms have their ordinary meanings. A number of terms are found in the disclosure whose meanings are generally utilized as described below.

AODV: Ad-hoc On-Demand Distance Vector, a routing protocol for data packets in ad-hoc wireless networks.

Mesh networks: In a mesh network topology each node relays data for the network, and all mesh nodes cooperate in the distribution of data in the network. Mesh networks are a type of ad-hoc (spontaneous, impromptu, or on-the-fly construction) network.

MIMO: Multiple Input Multiple Output; communications between two devices with multiple streams of data.

MU-MIMO: Multi-User Multiple Input Multiple Output; communications between a device and two or more nodes with single or multiple streams of data per node.

NL: neighbors list, a list of neighbor STAs for a given STA that exchanged either beamforming (BF) training or "Hello" messages with that given STA.

P2P: Peer-to-peer (P2P) communications arise when two or more stations are connected and share resources without going through a separate controller/server. A P2P network can be an ad hoc connection.

RREQ: Routing Request, a packet used in data routing protocols to discover the path between the source STA and the destination STA.

RREP: Routing Reply, a packet transmitted in response to RREQ in routing protocols. Upon reception of RREP by source STA it can start transmitting the data packets.

RSS: Received signal strength (RSS) is a measurement of the power present in a received radio signal.

SISO: Single Input Single Output; communications between two devices with single stream of data.

STA: Station; a logical entity that is a singly addressable instance of a medium access control (MAC) and physical layer (PHY) interface to the wireless medium (WM).

1.2. Topology Under Consideration

To aid in the present discussion a mmWave mesh network is considered by way of example and not limitation. Due to link budget limitations, it is desired to route data communications between the source STA and the destination STA.

Figure 1:
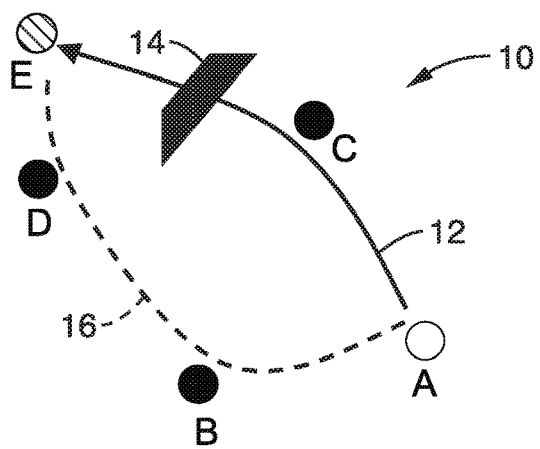
FIG. 1 and FIG. 2 are topology diagrams of an example wireless network having multiple peer stations through which primary and secondary routes are to be discovered according to an embodiment of the present disclosure.

FIG. 1 illustrates an example routing topology 10 having a plurality of stations, exemplified as A, B, C, D and E, although not limited to an specific number or relative positions or relations. Both a primary path (solid line) 12 and secondary path (dashed) 16 are to be determined from a source STA (STA A in this example) to a destination STA (STA E in this example) that processes the signals from the two paths. Despite a blocking object 14 arising on the primary path, a communication outage does not occur because of the transmission of the secondary path.

Using an on-demand routing protocol, the path selected from the source STA to destination STA is shown 12. When data transmission is started, this path (solid line) gets blocked. If the blockage persists for some period of time, retransmissions and feedback messaging would both fail. A redundant path (dashed line) 16 allows communications to be achieved without disruption, from the source STA to the destination STA. The source STA can utilize both paths to transmit the same data to the destination simultaneously.

Figure 2:
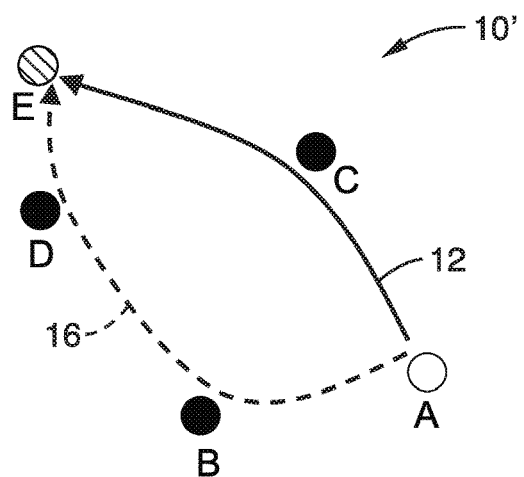

FIG. 2 depicts a slightly different setting 10', in which a source STA (STA A) and the destination STA (STA E) may be MIMO capable while the relays, or some of them, are not. In this example, the source STA (STA A) utilizes both the primary (solid line) 12 and secondary (dashed line) 16 paths to transmit two spatial data streams to the destination simultaneously.

2. Overview of Multiple Routes Discovery 2.1. Overview of Sequential Routes Discovery It was mentioned above that in some cases it would be desired to secure primary and secondary routes during the path discovery phase of a routing protocol.

Figure 3A:
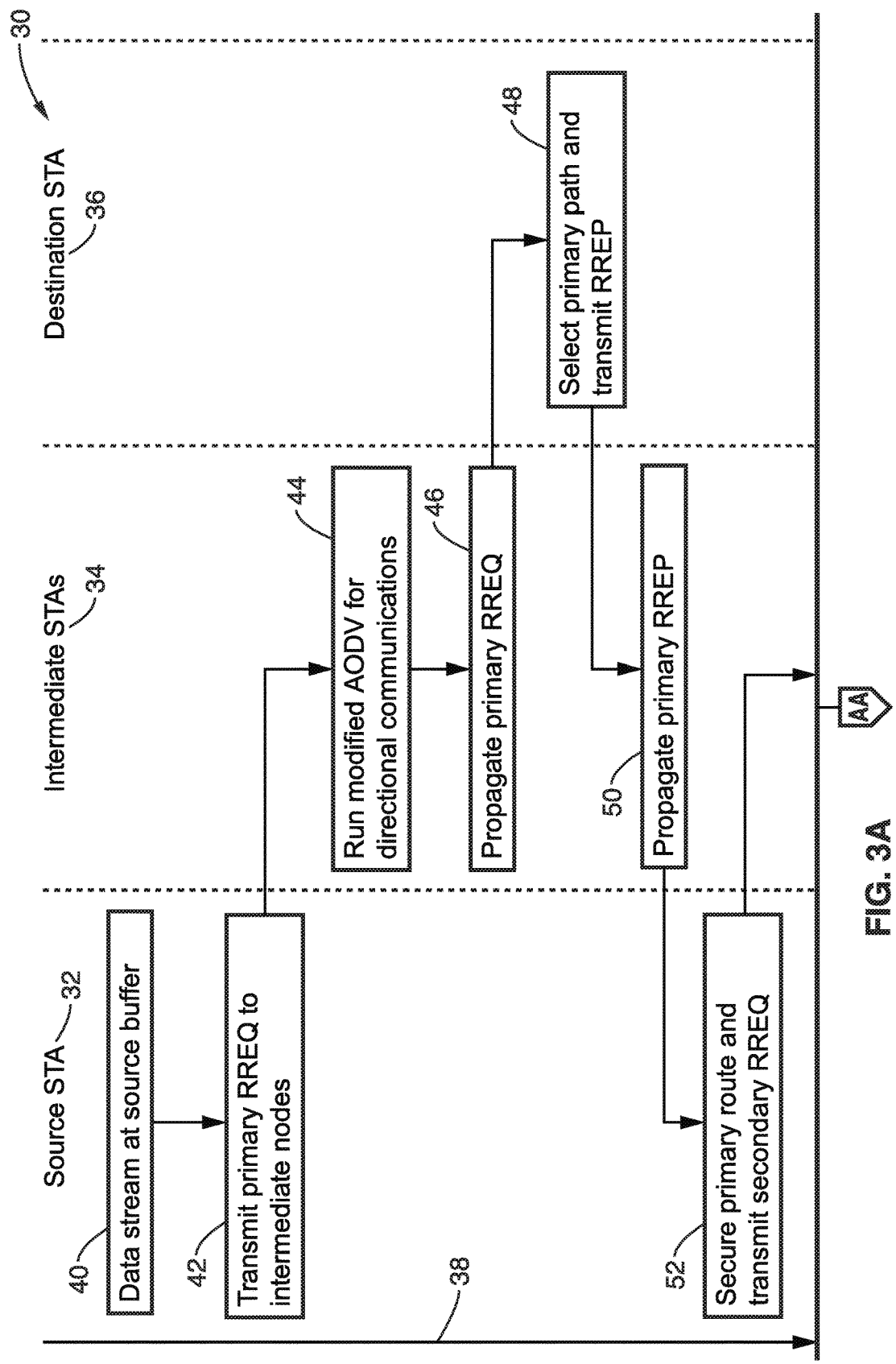
FIG. 3A and FIG. 3B is a messaging-flow timeline of sequentially securing a primary and secondary path from a source station to a destination station.
Figure 3B:
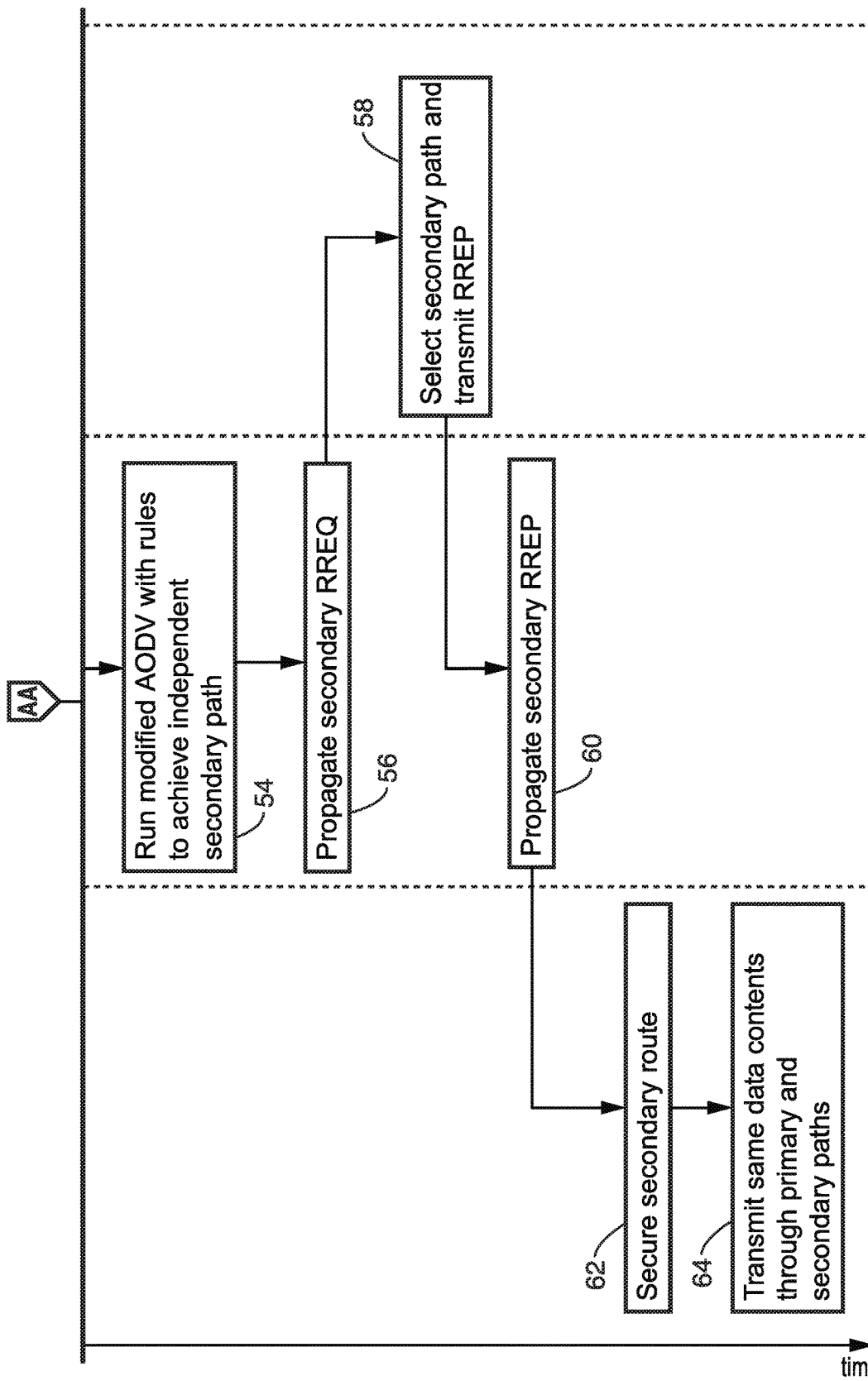

FIG. 3A and FIG. 3B illustrate an example embodiment 30 of a messaging flow-timeline of sequentially securing a primary and secondary path from source 32, through intermediate STAs 34, to a destination 36, with respect to a timeline 38. The disclosed protocol sets the primary path and secondary path from a source STA to a destination STA, in response to using modified RREQ and RREP information elements that are termed extended RREQ and extended RREP, respectively.

Following the flow of FIG. 3A, the protocol is triggered by source STA 32, which is seeking to send a spatial stream 40 in a robust transmission through intermediate STAs to a destination STA. The routing protocol starts by broadcasting an extended RREQ 42 to intermediate nodes (STAs) with its route flag set to primary. The rules for the primary route at the source STA, destination STA and the intermediate STAs (possible relays) follow those of the baseline routing protocol, which by way of example and not limitation is AODV, except for path metric cost adjustment due to MIMO capability.

At block 44 an intermediate node, which is MIMO capable, weighs its path cost favorably, and propagates in a unicast manner the primary RREQ 46, to another intermediate STA or to destination STA 36. The destination station selects a primary path 48 and transmits an RREP back toward the source STA 32, which is picked up by intermediate STA 34 which propagates 50 the RREP to source STA 32, which secures 52 the primary route.

When the primary route is secured, source STA triggers 52 path discovery of a secondary route by transmitting 52 an extended RREQ with its route flag set to secondary. Then as seen in FIG. 3B, the intermediate STA runs a modified AODV 54 and performs cost adjustments for MIMO capability and for secondary independence, then propagates 56 using a unicast technique this secondary RREQ to another intermediate STA or to destination STA 36, which after evaluating secondary route path cost, selects 58 a secondary path and transmits RREP to the intermediate 34. Intermediate 34 then propagates 60 this secondary RREP to source STA 32, which secures 62 the secondary route, and transmits 64 the same content through both the primary and secondary routes.

According to the disclosed protocol, the intermediate STAs and the destination STA deal differently with the secondary RREQ. They employ certain rules in the disclosed protocol which encourage the following. (a) The inclusion of MIMO STAs on the primary and secondary route to be able to use advanced physical layer MIMO communications schemes, such as spatial multiplexing and MU-MIMO. (b) Discovering of an end-to-end route that is not overlapped with the primary route.

Thus, in sequentially securing the primary and secondary routes, the source transmits an RREQ that is designated as an RREQ for a primary path. The intermediate STAs, acting as candidate relays, propagate the primary RREQ in a manner similar to an AODV protocol but tailored for directional transmission. For example such implementation of the modified AODV can be seen in "Routing Data Packets in Wireless Networks with Directional Transmissions", which is one of our previously filed patent applications filed with USPTO as Ser. No. 15/212,209. A number of the elements taught in that application can utilized in the implementation of the present disclosure.

The destination STA upon receiving the primary RREQ, responds with a primary RREP which is propagated by the STAs on the primary path until it reaches the source STA. Upon receiving the primary RREQ, the source STA secures the primary path and performs similar steps to secure a secondary path towards the destination STA. After securing the secondary path towards the destination STA, the source STA transmits data signals to the next hop STAs on the primary and secondary routes.

The sequential nature of this process can be seen from the above description, in which a first routing path is secure prior to seeking to obtain a second routing path.

2.2. Overview of One-shot Routes Discovery

Figure 4A:
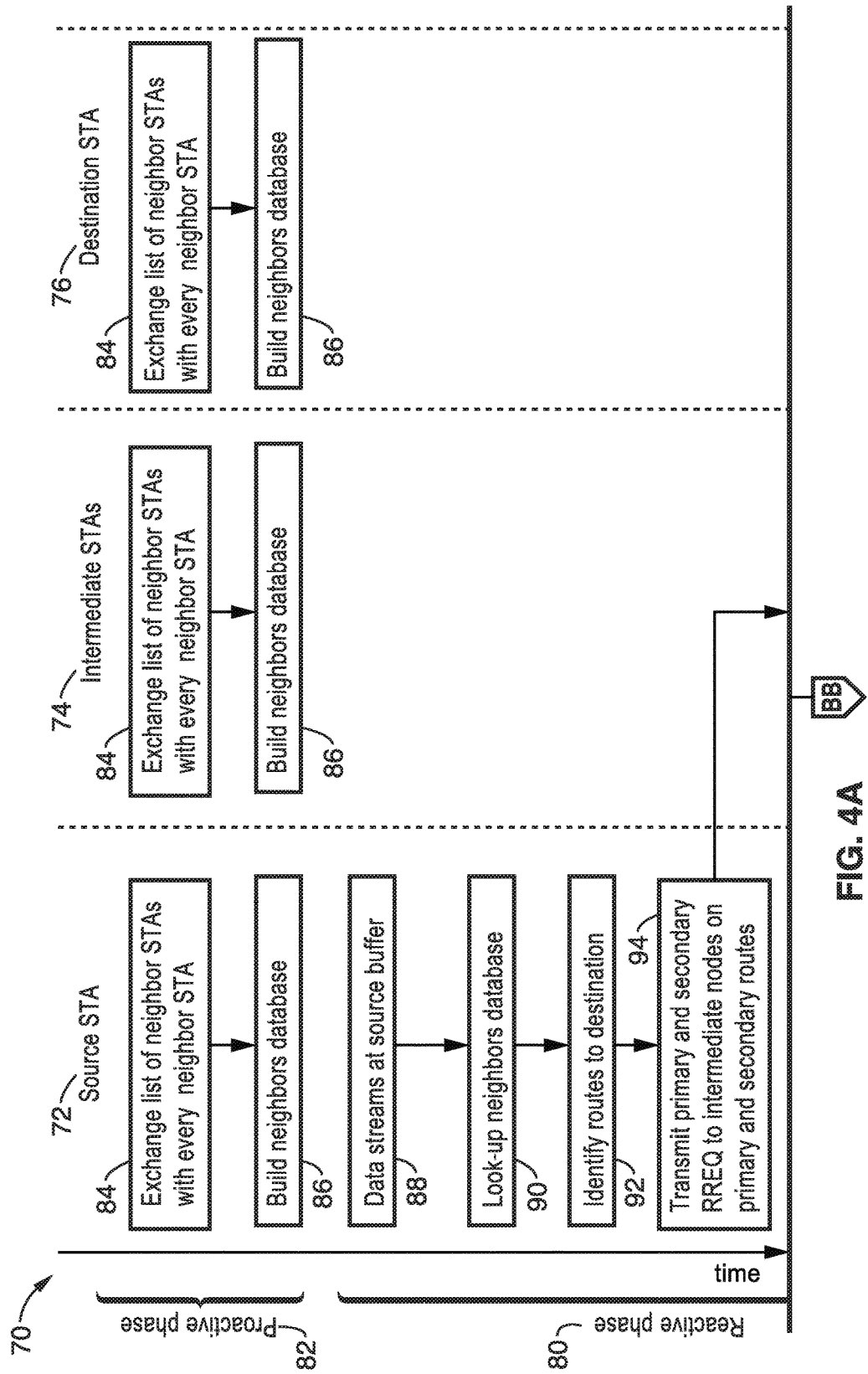
FIG. 4A and FIG. 4B is a messaging-flow timeline of non-sequentially (pseudo-simultaneously) securing both a primary and secondary path from a source station to a destination station, according to an embodiment of the present disclosure.
Figure 4B:
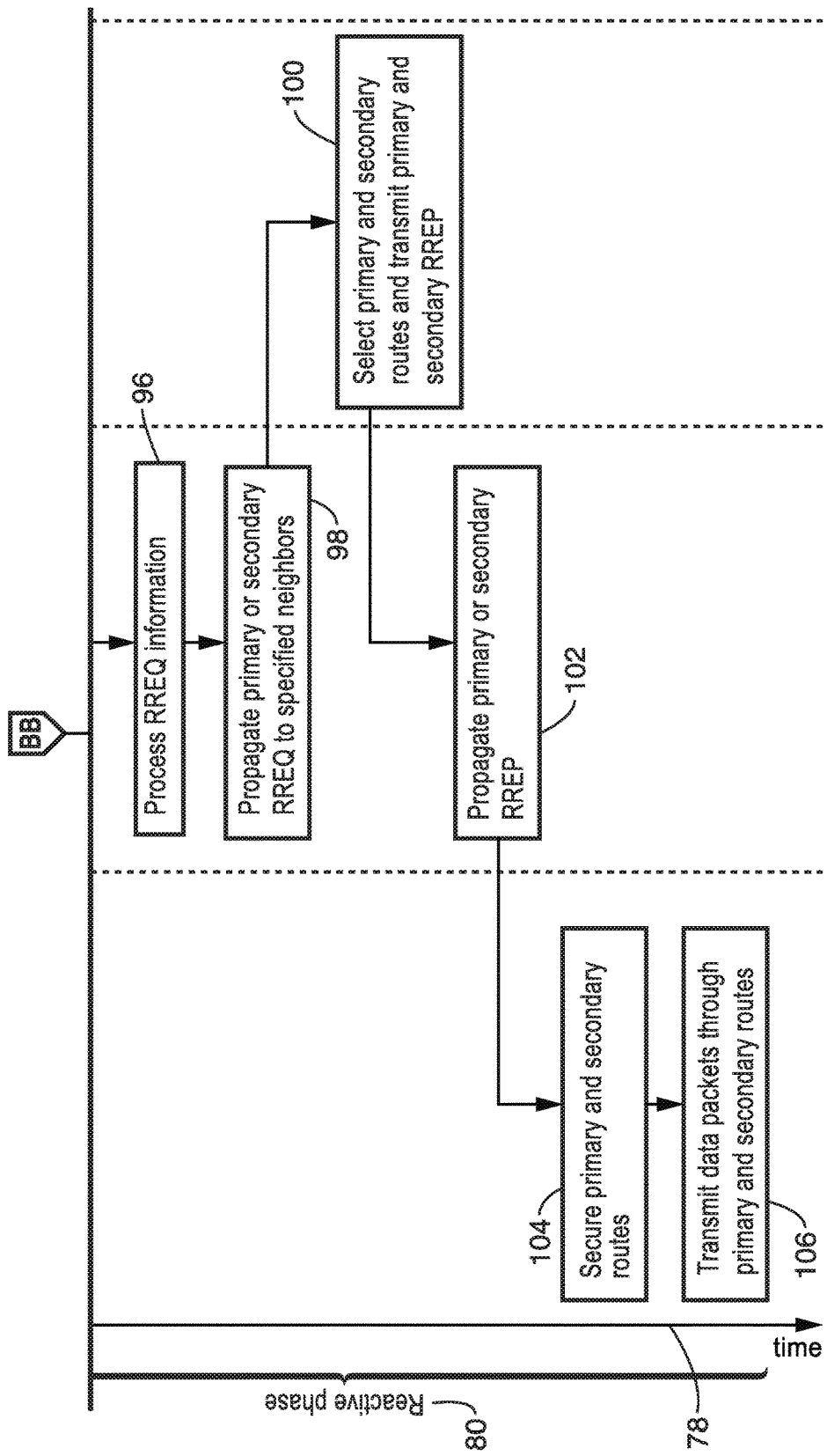

FIG. 4A and FIG. 4B illustrates an embodiment 70 of a messaging flow-timeline showing an overview of pseudo-simultaneous (non-sequential) routing according to the present disclosure so that the primary and secondary routes are obtained in a one-shot process. It should be appreciated that this one-shot process involves obtaining the routes non-sequentially, wherein one does not wait for discovering the first route, before attempting to discover a second route. This process is referred to herein as being pseudo-simultaneous, in that although the RREQ for the primary and second routes are not sent at the exact same time, they are sent without regard to awaiting for a response from other stations.

It will be seen from the figure that three types of stations are involved in the process, a source STA 72, intermediate STAs 74, and a destination STA 76. The process basically follows two phases; a proactive phase 82 and a reactive phase 80 (timer-based). In proactive phase 82 all the STAs exchange 84 a list of reliable neighbors between them. The STAs aggregate the neighbors list after processing them into a neighbors database 86.

The second phase 80, is triggered by the presence of data packets in the queue 88 of the source STA intended for a destination STA. In this phase, the source STA looks up the neighbors database 90. It identifies if one or more routes 92 exist towards the destination STA. The source STA then transmits RREQs 94 for both the primary and secondary routes. More particularly, an RREQ is transmitted to the next-hop STA on the primary path, which is called a 'primary RREQ', and then transmits an RREQ to the next-hop STA on the secondary path, which is called a 'secondary RREQ'.

In FIG. 4B it is seen that each intermediate STA, acting as a candidate relay, processes 96 this RREQ information, then propagate 98 the primary or the secondary RREQ in a manner similar to an AODV protocol but tailored for directional transmission and for simultaneous multiple path discovery. The set of rules employed by the intermediate STAs, to be described later, allows the discovery of two independent routes.

The destination STA, upon receiving the primary and secondary RREQ, responds 100 with a primary RREP and a secondary RREP. Both RREPs are propagated 102 by the intermediate STAs on the primary and secondary paths until it reaches 104 the source STA.

After securing both the primary and secondary routes towards the destination STA, the source STA transmits 106 data signals to the next hop STAs on the primary and secondary routes.

3. Elements of Routing Protocol

3.1. Exchange of Neighbors Lists (NL)

A Neighbors List (NL) is a list of neighbor (NL) STAs for a given STA that exchanged either BF training or "Hello" messages with that given STA. Upon expiration of a periodic timer, each STA transmits the NL information to its peers sequentially with directional (beamformed) transmissions. The exchanged list includes only reliable peer STAs to the STA transmitting this frame together with associated link quality, such as signal-to-noise ratio (SNR) information.

One way of identifying reliable peers is through the BF training phase that is assumed to have taken place between the stations.

Figure 5:
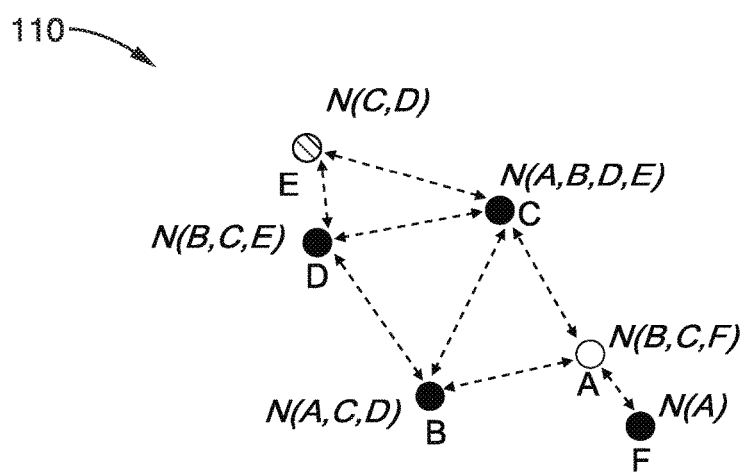
FIG. 5 is a network topology diagram showing lists of neighbor stations at each station depicted, according to an embodiment of the present disclosure.

FIG. 5 depicts the example routing topology of FIG. 1, showing a plurality of stations 110 (exemplified as STA A, B, C, D and E), and showing the list of neighbor STAs corresponding to the connections with other STAs as designated by the dashed arrows.

3.2. Construction of Neighbors Database

STAs record the neighbors list (NL) information received from each of its neighbor STAs to its internal neighbors database. A neighbors database of a STA is the aggregation of all neighbors list. It contains information about STAs in the neighborhood including their addresses, link quality, and reliable peers reported by each of these STAs.

For a given STA, each neighbor STA represents an entry in the database. The contents in each entry are the "K" neighbors of the neighbor STA and the link quality towards that neighbor STA. In other words, for a given STA, it may have N neighbor STAs and each of these N STAs may have K neighbor STAs.

Figure 6:
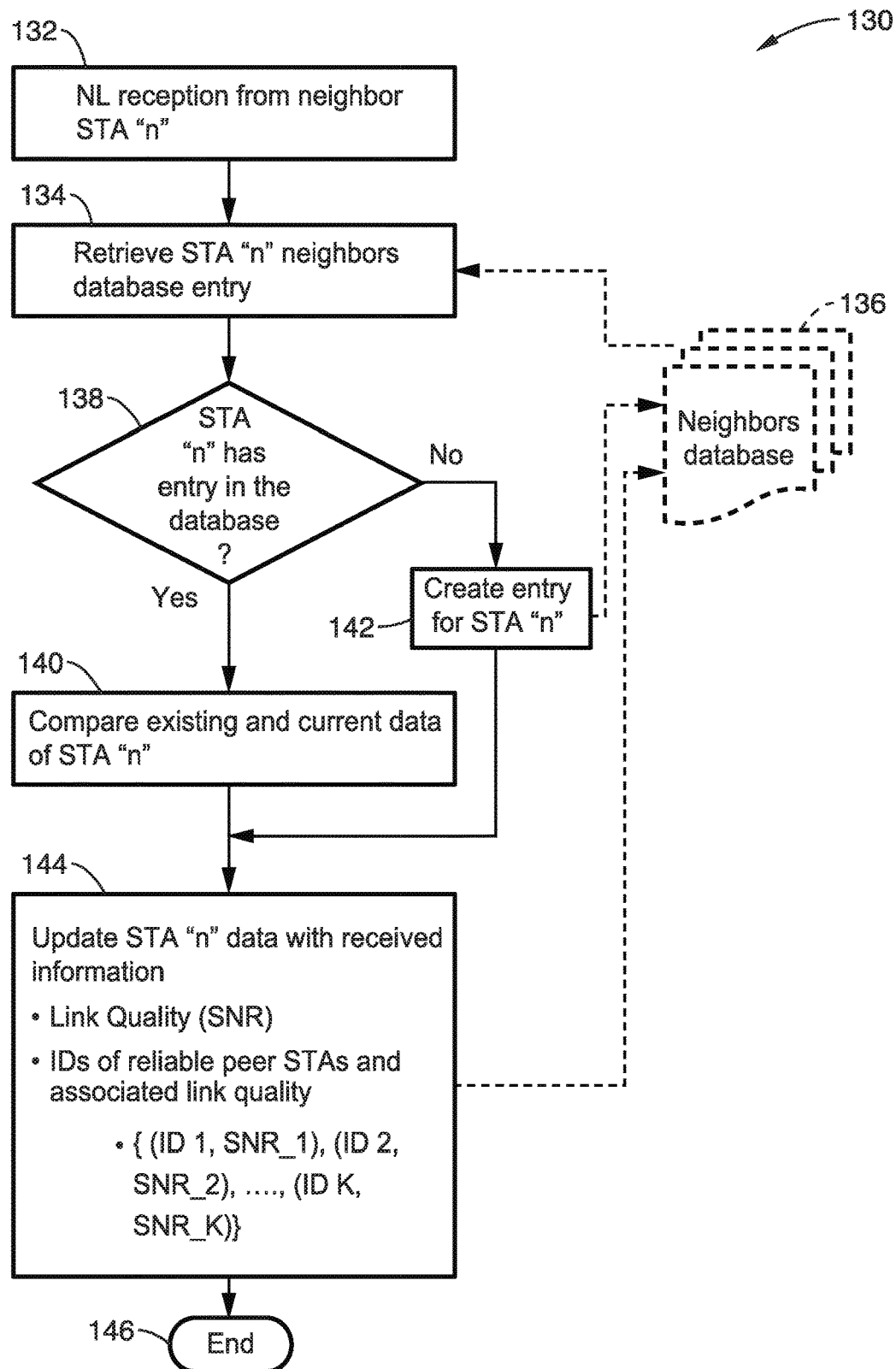
FIG. 6 is a flow diagram of recording entries in the neighbor list, according to an embodiment of the present disclosure.

FIG. 6 illustrates an example embodiment 130 of recording entries of the neighbors database. The neighbor list recording process is activated per NL reception 132 from a neighbor STA. Then STA "n" neighbors list is retrieved 134 from the database 136 entry. A check is made 138 if STA "n" has an entry in the database. If not, then an entry is created 142 for STA "n", otherwise a comparison is made 140 between the retrieved data and the existing data for STA "n" to check if an update of this data is needed or not. If an update is needed or no entry exists for STA "n", then STA "n" information is updated 144 with received information, such as including link quality information (e.g., SNR), IDs of reliable peers STAs and their link quality, to complete 146 the process.

Figure 7:
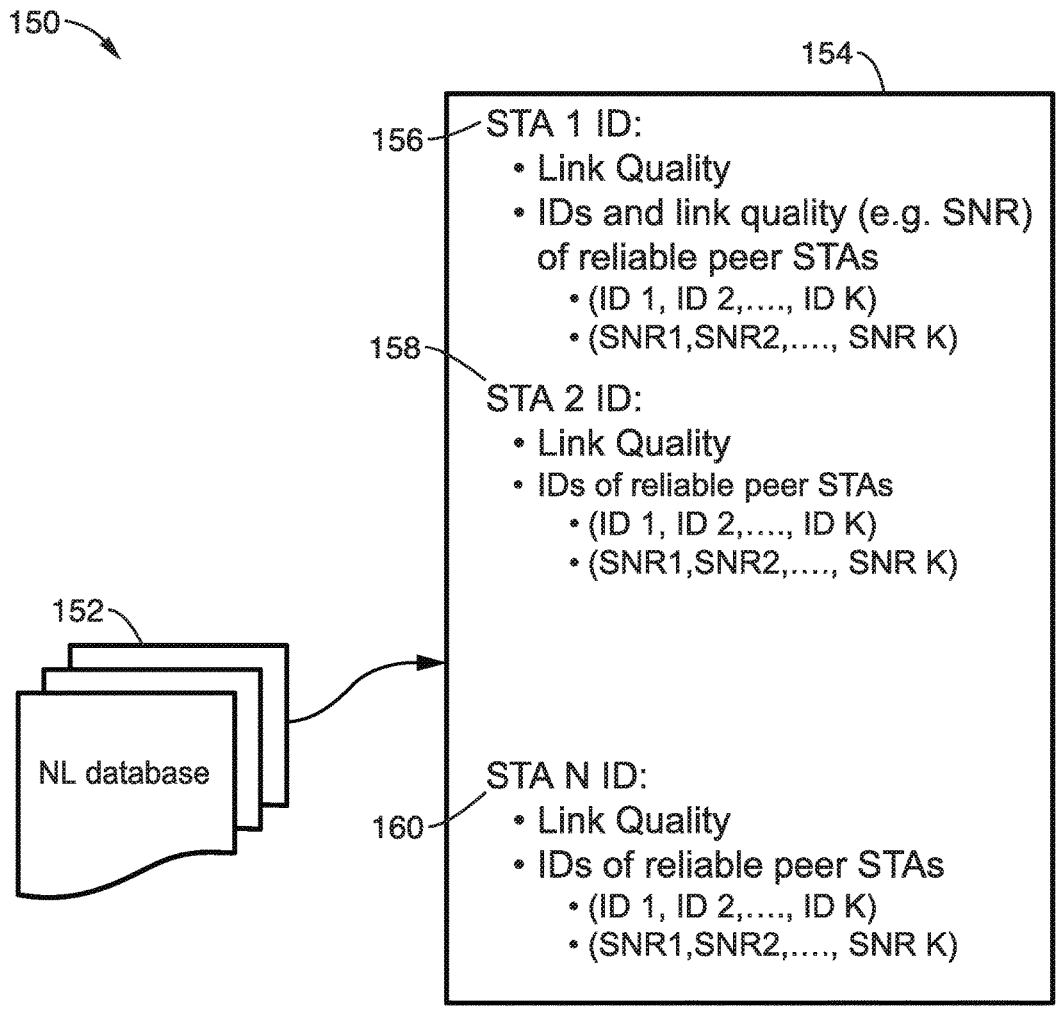
FIG. 7 is a diagram of an example neighbor list utilized according to an embodiment of the present disclosure.

FIG. 7 illustrates an example embodiment 150 of the neighbors database. One of the NL databases 152 is shown 154, depicting information for each of its neighbor STAs, showing in this case information 156 for STA 1, information 158 for STA 2, and on down through information 160 for STA N.

3.3. Extended RREQ and Extended RREP

Modified RREQ and RREP information elements with respect to state-of-the-art AODV routing protocols are introduced. They are termed extended RREQ and extended RREP, respectively.

Figure 8:
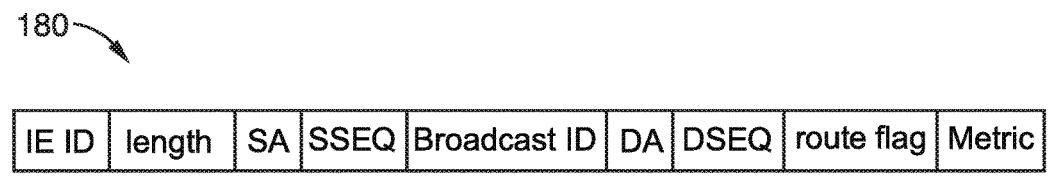
FIG. 8 is a data field diagram of an extended routing request (RREQ) utilized according to an embodiment of the present disclosure.

FIG. 8 illustrates field contents of an extended routing CTS frame, having the following fields. The extension in this RREQ information entity is readily seen with this frame additionally including fields: SA, DA, lifetime, and time offset. It should be noted that in general four types of address fields are used in sending a frame over multiple hops, for instance SA, DA, TA, and RA. SA (Source Address) is an additional field that indicates who the frame is originated from. SA is unchanged throughout multiple hops when the frame travels over multiple hops. DA (Destination Address) is an additional field that indicates who the frame is destined to. DA is unchanged throughout multiple hops when the frame travels over multiple hops. TA (Transmitter Address) indicates who transmitted the frame physically. TA differs hop by hop when the frame travels over multiple hops. RA (Receiver Address) indicates who is supposed to receive the frame physically. RA differs hop-by-hop when the frame travels over multiple hops.

IE ID: (frame control) contains information about the type of the frame, power management information, and so forth;
Length: The total length of the IE in bytes;
SA: Source (originator) STA MAC address;
SSEQ: Source sequence number;
Broadcast ID: a counter that in incremented whenever the source issues a new RREQ;
DA: Destination (final) STA address;
DSEQ: Destination sequence number;
Route flag: a new field with one bit of information indicating either the extended RREQ/RREP IE is meant for a primary or a secondary route;
Metric: a number indicating link quality of the path, such as hop count, SNR, or alternative. It is updated every time the RREQ is transmitted by an intermediate STA.

Figure 9:
FIG. 9 is a data field diagram of an extended routing reply (RREP) utilized according to an embodiment of the present disclosure.

FIG. 9 illustrates fields of an Extended RREP IE having the following fields:
IE ID: a group of bits specifying the type of the information element.
Length: the total length of the IE in bytes;
SA: Source (originator) STA MAC address;
DA: Destination (final) STA address;
DSEQ: Destination sequence number;
Route flag: a new field with one bit of information indicating either the extended RREQ/RREP IE is meant for a primary or a secondary route;
Lifetime: The time for which the STA receiving the CTS consider the data it has in its buffer to be valid; and
Metric: a number indicating link quality of the path, such as hop count, SNR, or alternative. It is updated every time the RREQ is transmitted by an intermediate STA.

4. Details of Routing Protocol

4.1. Rules at Source STA for Multiple Route Discovery

The logic run by the source STA to route data on primary and secondary paths is depicted in FIGS. 10A and 10B, FIG. 11, and FIG. 12.

Figure 10A:
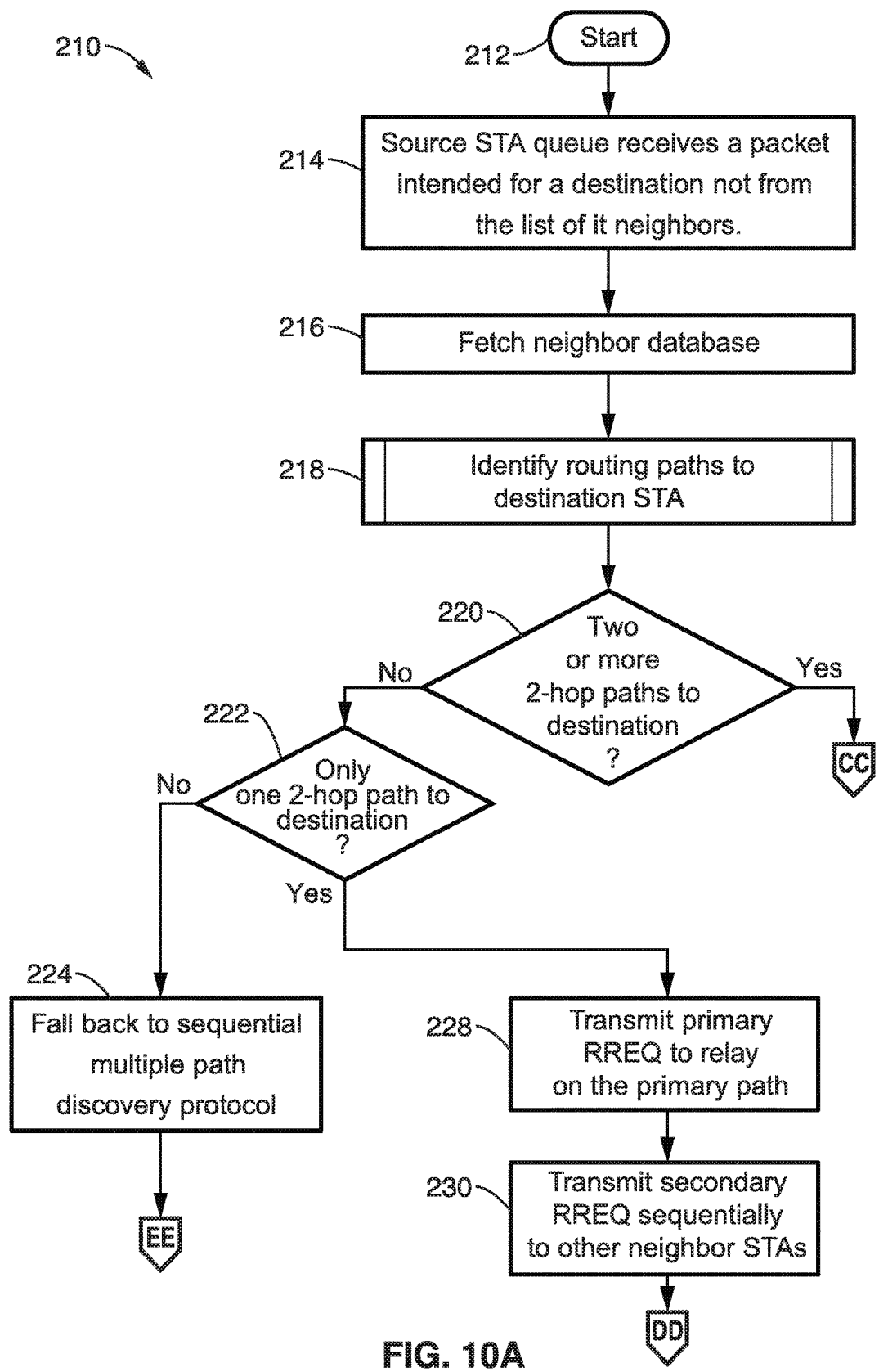
FIG. 10A and FIG. 10B is a flow diagram of a source STA pseudo-simultaneously securing primary and secondary routes, according to an embodiment of the present disclosure.
Figure 10B:
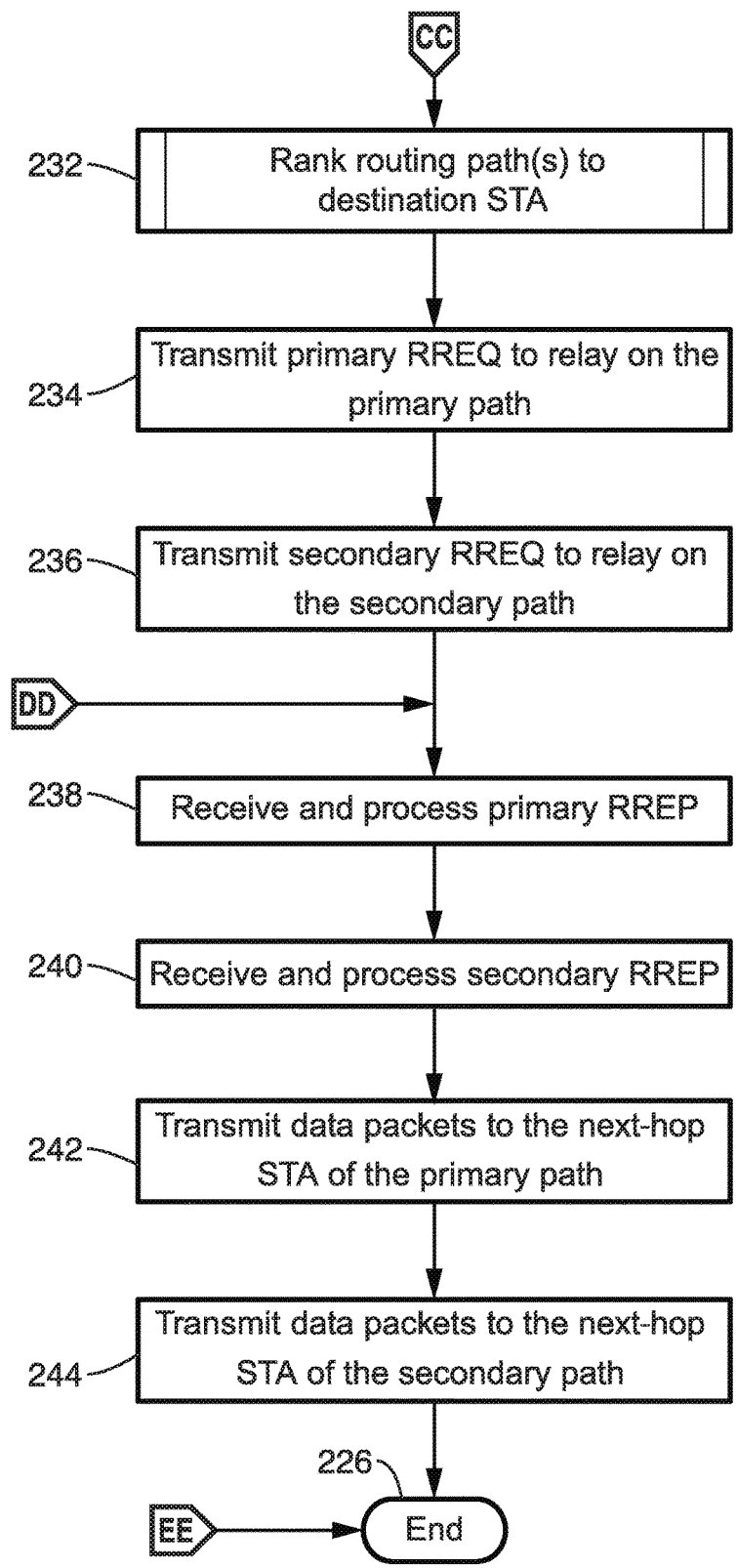

FIG. 10A and FIG. 10B illustrate an example embodiment 210 of source STA logic to secure primary and secondary routes. The process starts 212 with the source STA receiving a packet 214 at its transmission queue intended for a destination that is not one of its direct (immediate) neighbors. The NL is fetched 216 and checked 218 to identify if routing paths exist to the destination STA in this neighbors list.

A check is made 220 if the NL shows at least two multiple (e.g., two) hop paths to the destination. If there are not at least two of these paths, then it checks 222, if there is only such path. If even that is not found, then it has no path and falls back 224 on using a sequential multiple path discovery protocol and ends 226. If it finds one two hop path, then it moves to step 228 to transmit primary RREQ to relay on the primary path, and then to transmit 230 a secondary RREQ sequentially to other STAs in a unicast fashion, before reaching block 238 in FIG. 10B. If check 220, however, locates at least two of the two hop paths, then it moves to block 232 in FIG. 10B, where a ranking of these "M" routing two-hop path(s) to destination STA is performed. It at least one embodiment, the path with the highest link quality is designated a primary path and the second ranked path is designated a secondary path. The primary RREQ is transmitted 234 to relay on the primary path, and then the secondary RREQ is transmitted 236 to relay on the secondary path.

After a period of time (e.g., in response to network distances, traffic, and response times), the source STA receives and processes the responses through the intermediate STAs from the destination STA. In particular, block 238 illustrates receiving and processing the primary RREP, while block 240 illustrates processing the secondary RREP. Now that both paths are established, the source STA transmits 242 data packets to the next-hop STA of the primary path, and then similarly transmits 244 data packets to the next-hop STA of the secondary path, and ends 246 the process.

Figure 11:
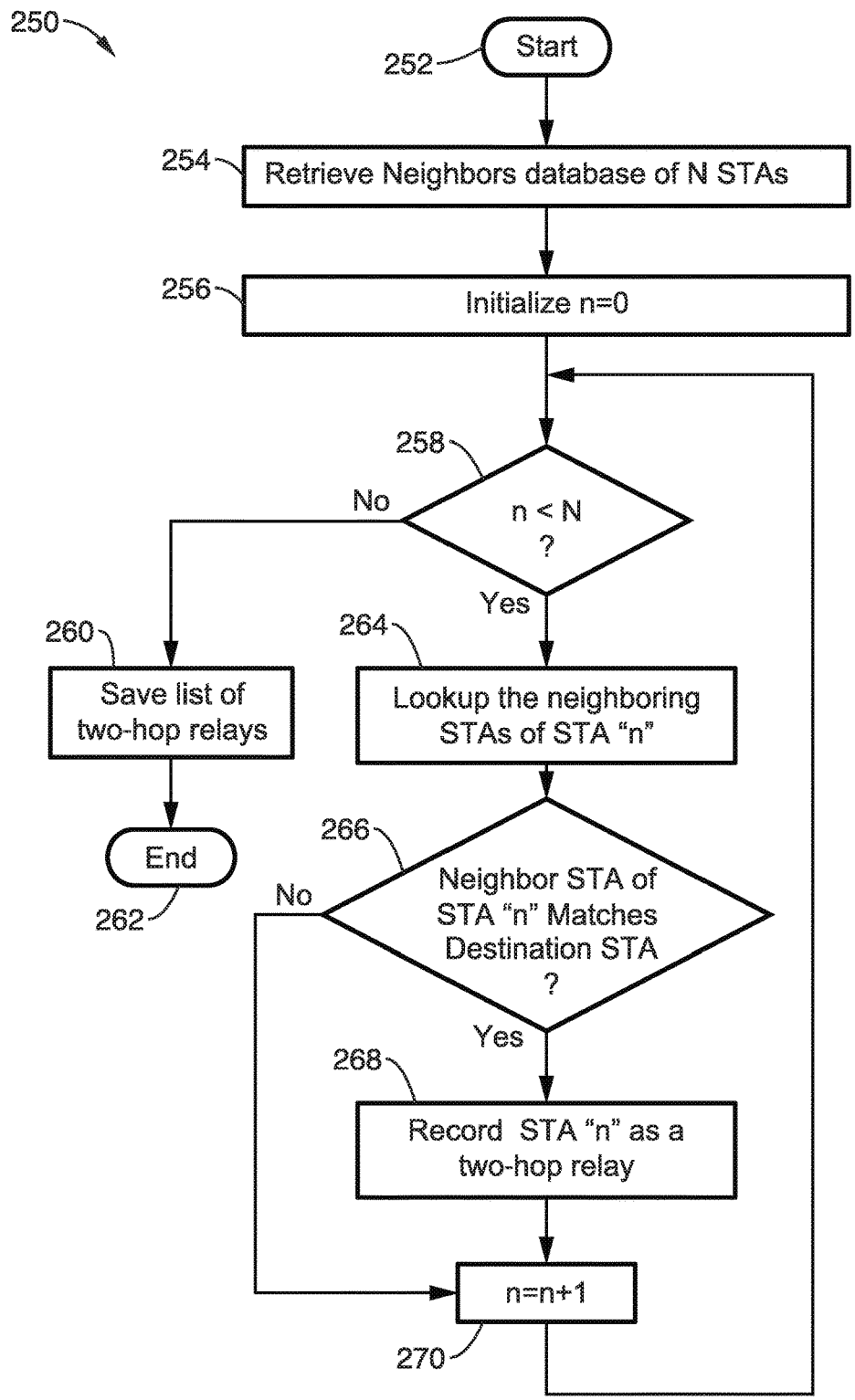
FIG. 11 is a flow diagram of a source STA identifying routing paths to a destination for securing primary and secondary routes, according to an embodiment of the present disclosure.

FIG. 11 illustrates an embodiment 250 for identifying routing paths to a destination STA, as was previously encapsulated in block 218 of FIG. 10A, and is now shown in an expanded format.

The process commences 252 and retrieves 254 the NL data base of N STAs. A loop counter is initialized 256, and in the body of the loop, a loop count is checked 258, to determine if the N STAs are still being checked. If not, that is to say looping is complete and all STAs have been checked, then block 260 is executed to save the list of multiple hop relays, and to end this process 262. Otherwise, the next of the N STAs is checked by looking up (querying, searching, comparing) 264 the neighboring STAs of STA "n". A check is then made if neighbor STA of STA "n" matches the destination STA. If there is not a match, then the counter n is advanced 270 to refer to the next STA, and execution moves back to the top of the loop at block 258. Otherwise, if a match is found in block 266, then STA "n" is recorded 268 (e.g., marked, noted, flagged, stored) as a two hop relay, prior to moving to step 270 to advance the loop counter.

Figure 12:
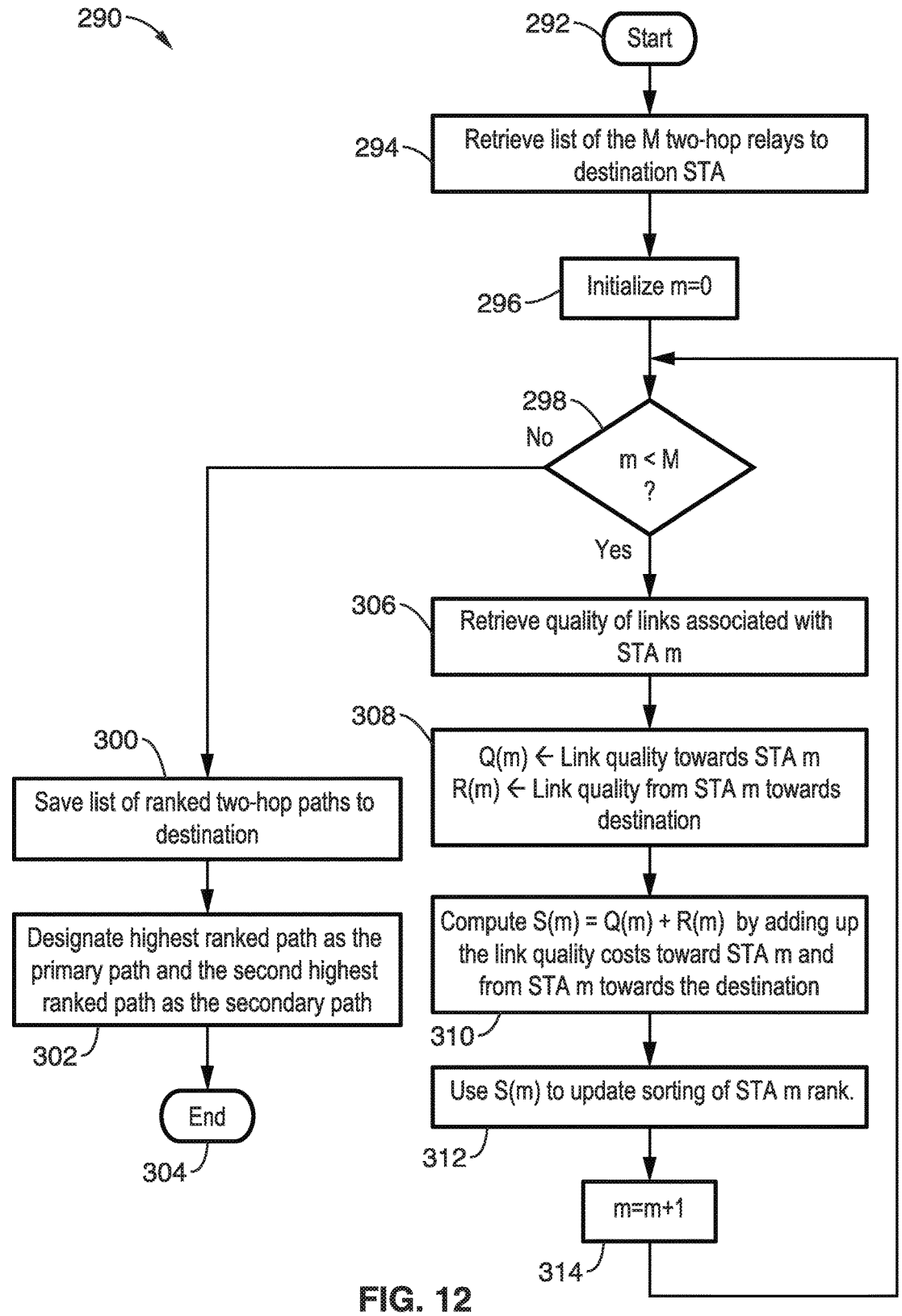
FIG. 12 is a flow diagram of ranking routing paths when securing primary and secondary routes, according to an embodiment of the present disclosure.

FIG. 12 illustrates an embodiment 290 for ranking routing paths to a destination STA, as was previously encapsulated in block 232 of FIG. 10B, and is now shown here in an expanded format.

The process commences 292 and retrieves 294 a list of the "M" multiple hop relays to a destination STA. A loop counter m for the M hop relays is initialized 296, and the loop commences 298 with checking if the loop is still in progress. If looping is not still in progress, thus it is complete having already executed through all M multiple hop relays, then block 300 is executed to save the list of ranked multiple hop paths to the destination, and then paths are designated 302, such as with the highest ranked path designated as the primary path, and the second highest ranked path being designated as the secondary path, to end 304 the process.

Otherwise, the next loop iteration from block 298 retrieves link quality information 306 associated with STA M, and stores this information 308 with link quality toward STA m being stored in a variable, here marked Q(m), and also storing link quality from STA m towards destination in a variable, here marked R(m). Then in block 310 a value referred to here as S(m) is determined as S(m)=Q(m)+R(m), which adds the link quality towards STA m and from STA m. The value of S(m) is then used 312 to update sorting of the STA m rank. After this, the loop counter m is incremented 314 and execution returns to the top of the loop at block 298.

4.2. Rules at Intermediate STAs for Multiple Route Discovery

The intermediate STAs also execute instructions for enabling the disclosed one-shot routing protocol. The flow chart depicted in FIG. 12 explains this logic.

One of the core concepts of the logic is to satisfy different conditions for the type of routing management packet received at the intermediate STAs. These packets can be redundant ones, meaning it was received previously from another STA, or it could be a new primary or secondary RREQ or RREP Another core concept of the logic is to support the type of the intermediate STAs being the relay on a two-hop primary path from the source to the destination, the relay on a two-hop secondary path from the source to the destination, or a general intermediate STA on a primary or secondary path.

Figure 13A:
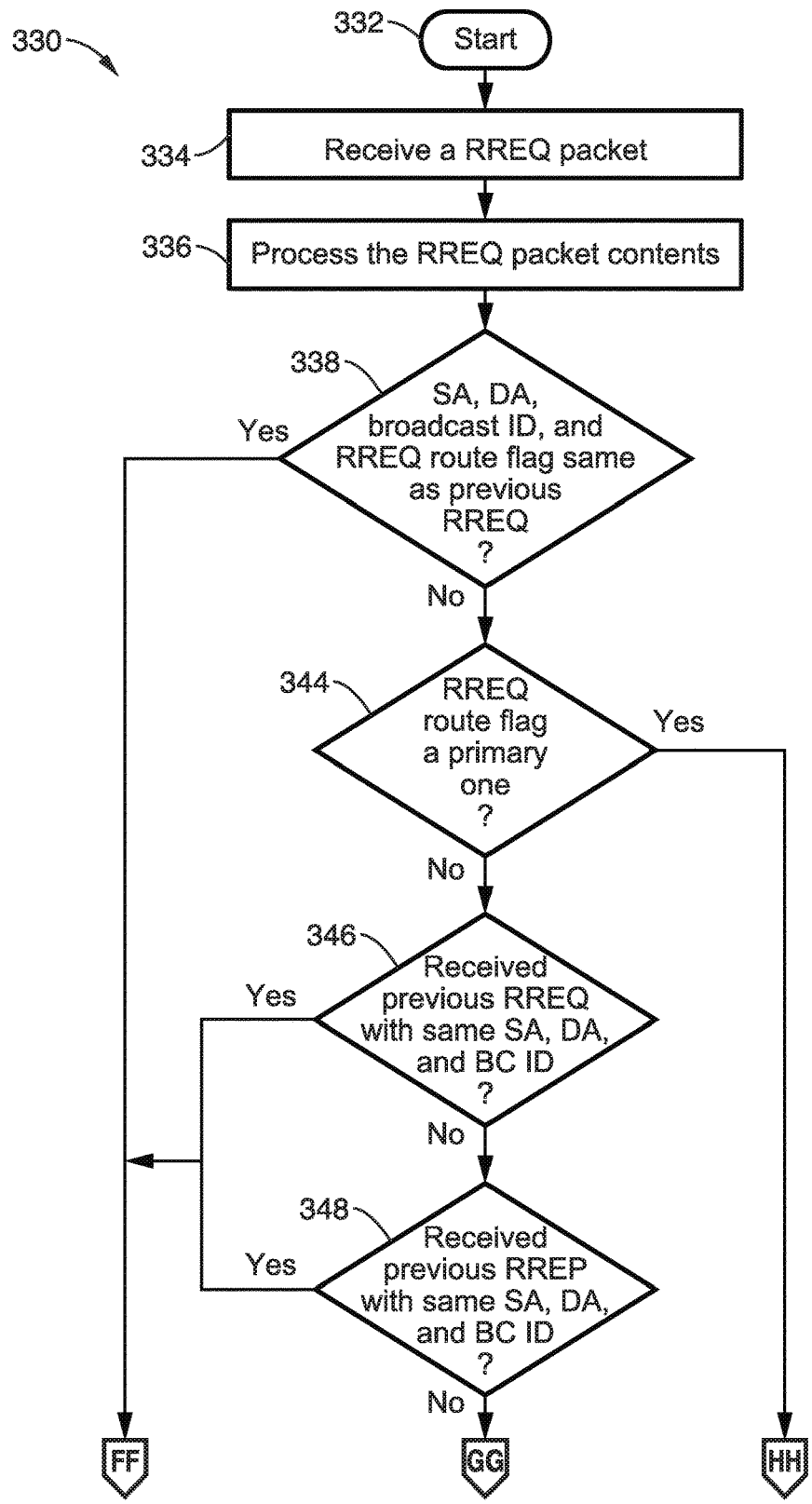
FIG. 13A and FIG. 13B is a flow diagram of processing RREQs at intermediate STAs when securing primary and secondary routes, according to an embodiment of the present disclosure.
Figure 13B:
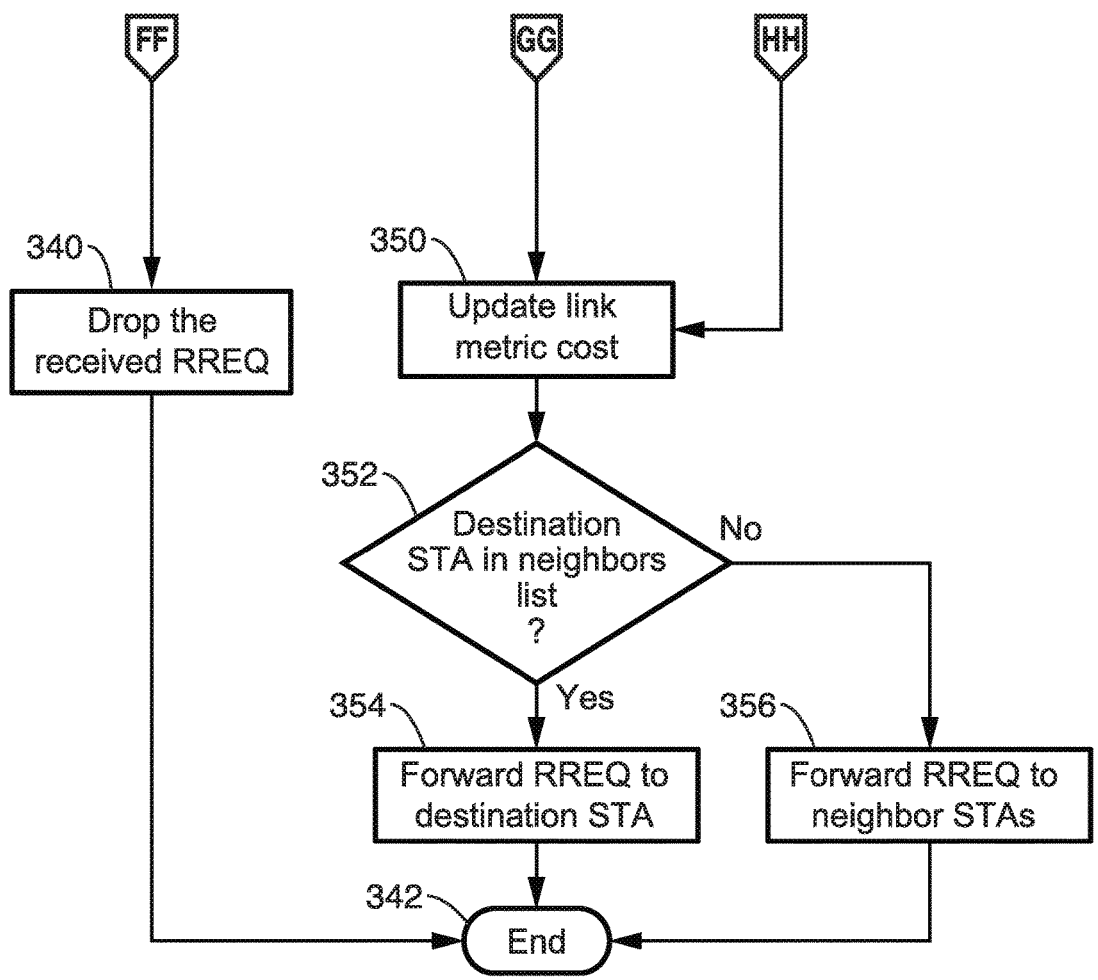

FIG. 13A and FIG. 13B illustrate an embodiment 330 of processing RREQs at the intermediate nodes. Execution starts 332 and a RREQ packet is received 334 and processed 336. After processing the RREQ frame, the intermediate STA checks 338 if this RREQ was previously received. In at least one embodiment, the RREQ is considered to be previously received if it contains the same SA, DA broadcast ID, and RREQ route flag as a previously received RREQ. If the RREQ was previously received, then execution moves to block 340 in FIG. 13B to drop the received RREQ and end the process 342. Otherwise, since the RREQ is not the same, execution moves to block 344 with a check on the RREQ route flag, as to whether it indicates a primary path. If at block 344 it is found to be a primary path, then execution moves to block 350 in FIG. 13B to update 350 the link cost metric, and proceed with forwarding the RREQ.

If not indicating a primary path in block 344, then block 346 is executed to check if the received previous RREQ had same SA, DA and Broadcast (BC) ID. Note that to reach block 346 this must be with a different RREQ route flag, as it is not a previously sent RREQ. Then a check is made for previous RREPs having the same SA, DA and Broadcast (BC) ID. If either of these conditions are met, then execution moves to block 340 to drop the RREQ and end; thus making sure that the intermediate STA is not on a path that has been selected before as a route from the source to the destination. The above conditions guarantee non-overlapping of the primary and secondary routes. Otherwise, execution moves to block 350 to update the link cost metric, and check 352 for destination STA in the neighbors list. If the destination is found in the NL, then the RREQ is forwarded 354 to the destination STA, otherwise the RREQ is forwarded 356 to other reliable intermediate STAs which will forward it to the destination STA, before the process ends 342.

5. Example: Routing Data Through Primary and Secondary Paths

In FIG. 14A through FIG. 14F, illustrate applying the disclosed routing protocol on an example mmWave mesh network, shown with STAs A through F depicting STAs exchanging data using the described one-shot route discovery protocol. The mmWave mesh network is shown with the bidirectional links between the STAs in the network, while also showing the neighborhood of each STA.

Figure 14A:
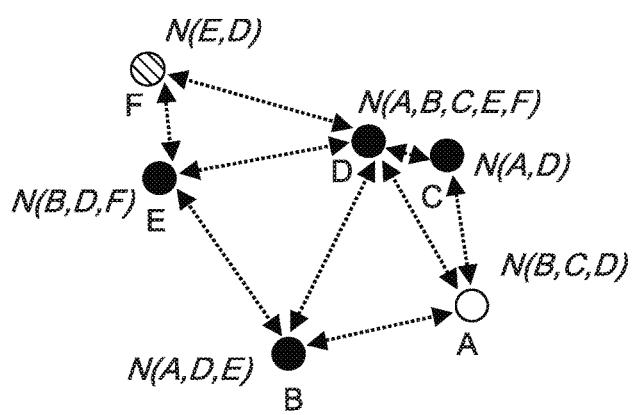
FIG. 14A through FIG. 14F are topology diagrams upon which route discovery are shown, according to an embodiment of the present disclosure.

In FIG. 14A the topology is seen with STAs A, B, C, D, E and F. Table 1 gives information about the neighbors from the perspective of STA A seen in FIG. 14A. The table shows which STA is a neighbor STA that can reliably communicate with STA A on the first column. The second column shows the neighbors of each STA in the first column. Finally, the third column shows the link quality Q( . . . ) between the first column STA towards its neighbors. It should be appreciated that destination STA "F" could be communicated in two hops by the help of the relay STA "D". This is the only two-hop path to the destination STA. Hence, it is designated the primary path as explained before in the proposed one-shot path discovery protocol. The secondary path will be discovered through propagation of the secondary RREQ.

Figure 14B:
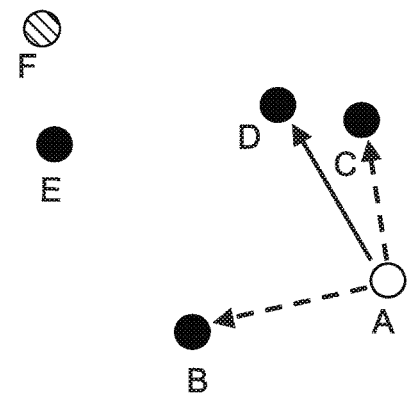

In FIG. 14B a primary RREQ frame (Solid) is shown transmitted to STA D, with a secondary RREQ frame (dashed) unicasted to STA C and then STA B.

Figure 14C:
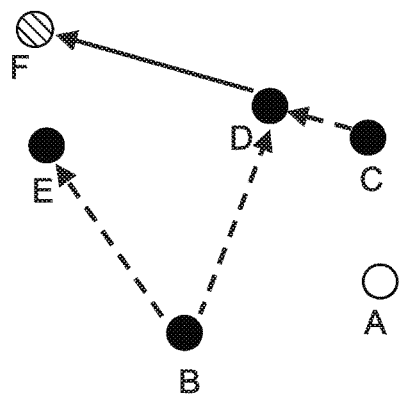

In FIG. 14C a primary RREQ frame (Solid) is transmitted from the relay STA D to the destination STA F, with secondary RREQ frame (dashed) propagated in a unicast mode of transmission from STA C and from STA B to its neighbors.

Figure 14D:
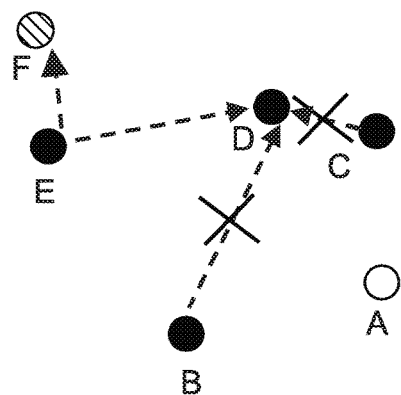

In FIG. 14D STA D according to the rules of the routing protocol described before will drop the received secondary RREQ, as symbolized by the cross signs over these links. STA E will propagate the secondary RREQ sequentially to STA F and STA D.

Figure 14E:
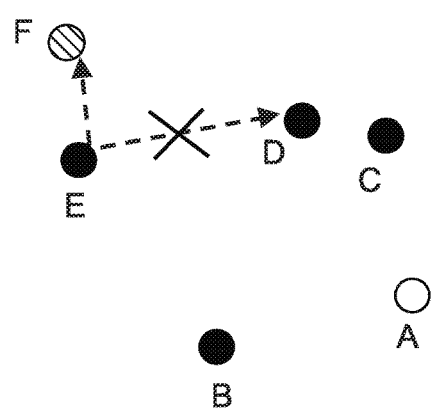

In FIG. 14E, similarly STA D will drop the secondary RREQ received from STA E, as denoted by the X marking.

Figure 14F:
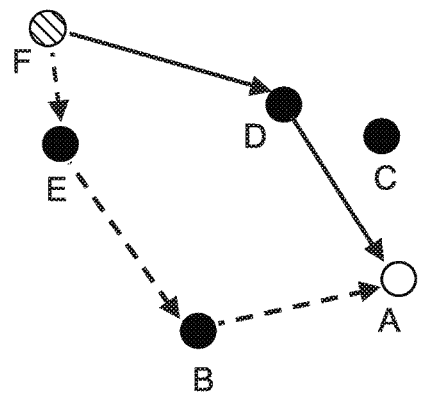

In FIG. 14F the primary (solid) and secondary (dashed) RREP frames propagation is shown back to STA A. It will be noted that the end of this phase secures the primary and the secondary routes.

Figure 15B:
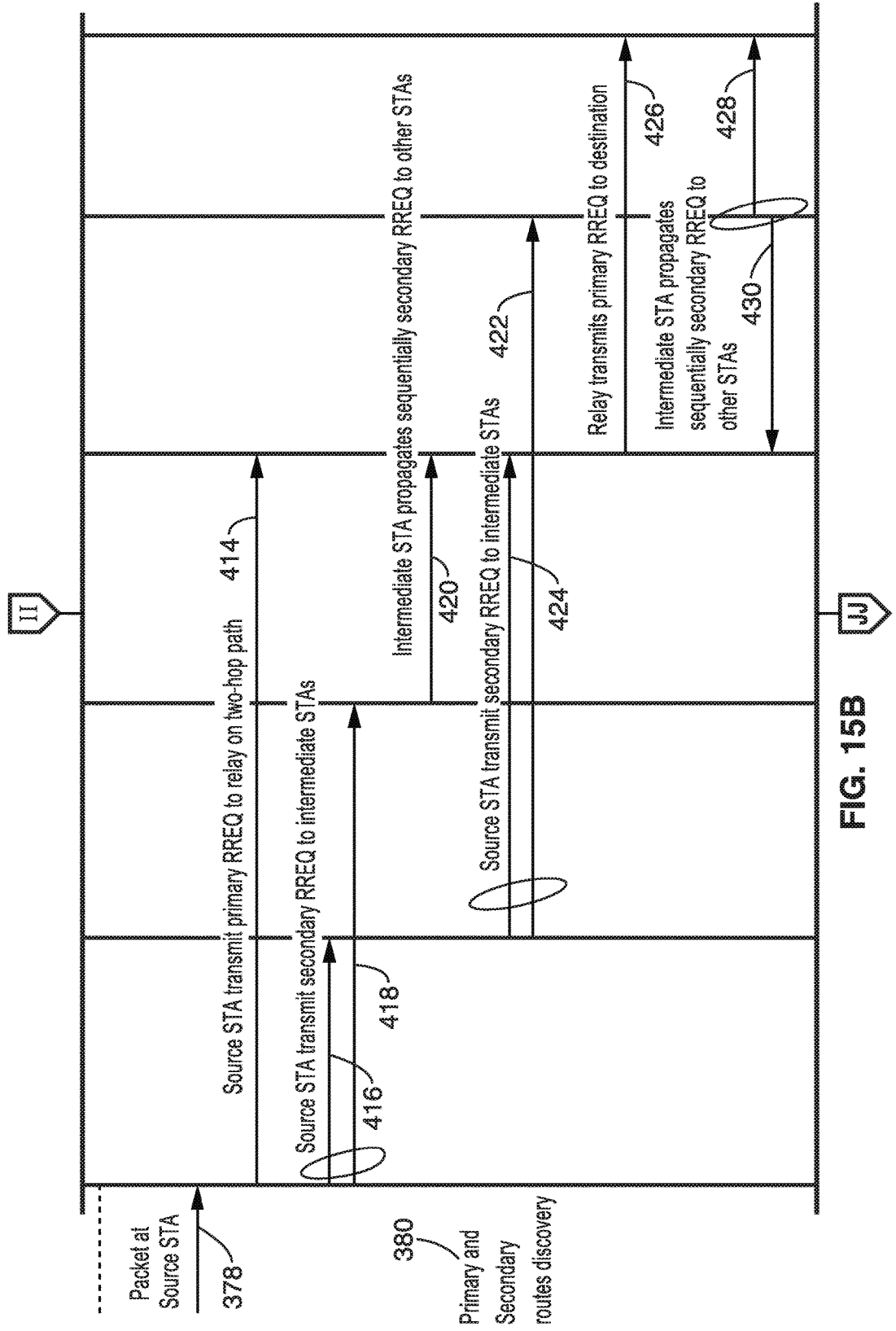

FIG. 15A through FIG. 15C illustrate an embodiment 370 of message flow to accomplish data communications in the mesh network topology depicted in FIG. 14A through FIG. 14F.

In the figure, coordination is seen between STA A 372a, STA B 372b, STA C 372c, STA D 372d, STA E 372e, and STA F 372f, with a time line moving down the pages, with a proactive phase 375 following timer expiration 374, followed by a neighbors discovery phase 376, and a primary and secondary routes discovery phase 380. In this example, the proactive stage 375 is seen being entered in response to a periodic timer expiration 374. In at least one embodiment, the timer is running in the STA, such as over a processor inside the STA, to determine time driven events and initiate a processing event when the timer expires (fires). The timer is programmed to fire periodically to activate the proactive phase of signaling. During proactive phase 375, each STA is seen communicating a neighbor list (NL) to a reliable peer STA. In particular, STA A communicates its neighbor list to multiple neighbors 382; in particular neighbor list 384 is sent to STA B, list 386 to STA C, and list 388 to STA D 388 with its neighboring stations. STA B shares its list 389 with STA A, list 390 with STA D, and list 392 with STA E. STA C shares its list 394 with STA D and list 396 with STA A. STA D shares its list 398 with STA C, list 400 with STA B, list 402 with STA E, list 404 with STA A, and list 406 with STA F. STA E shares its list 408 with STA D, list 410 with STA B, and list 412 with STA F. STA F shares its list 414 with STA E and list 416 with STA D.

To this point the neighbor lists have been shared (are up to date). In response to receipt of a packet 378 at the source STA (here exemplified as STA A) in FIG. 15B, directed to destination STA F, then the source STA transmits 414 a primary RREQ to relay on a two-hop path (from STA A to STA D, then to STA E). A secondary RREQ is sent to STA B 416 and to STA C 418. Intermediate STA C propagates the RREQ 420 to STA D. Intermediate STA B propagates the RREQ to STA E 422 and to STA D 424. Then STA D transmits the primary RREQ 426 to destination STA F. Intermediate STA E propagates secondary RREQ to STA D 430, and to STA F 428.

Then in FIG. 15C the replies are being returned, with a primary RREP unicast to two hop relay to STA D 432. STA F unicasts secondary RREP to intermediate STAs 434. The intermediate STAs unicast secondary RREP to other intermediate STAs on the secondary routes 436. And finally, the intermediate STA unicasts the secondary RREP to intermediate STAs on the secondary routes 438.

Figure 16:
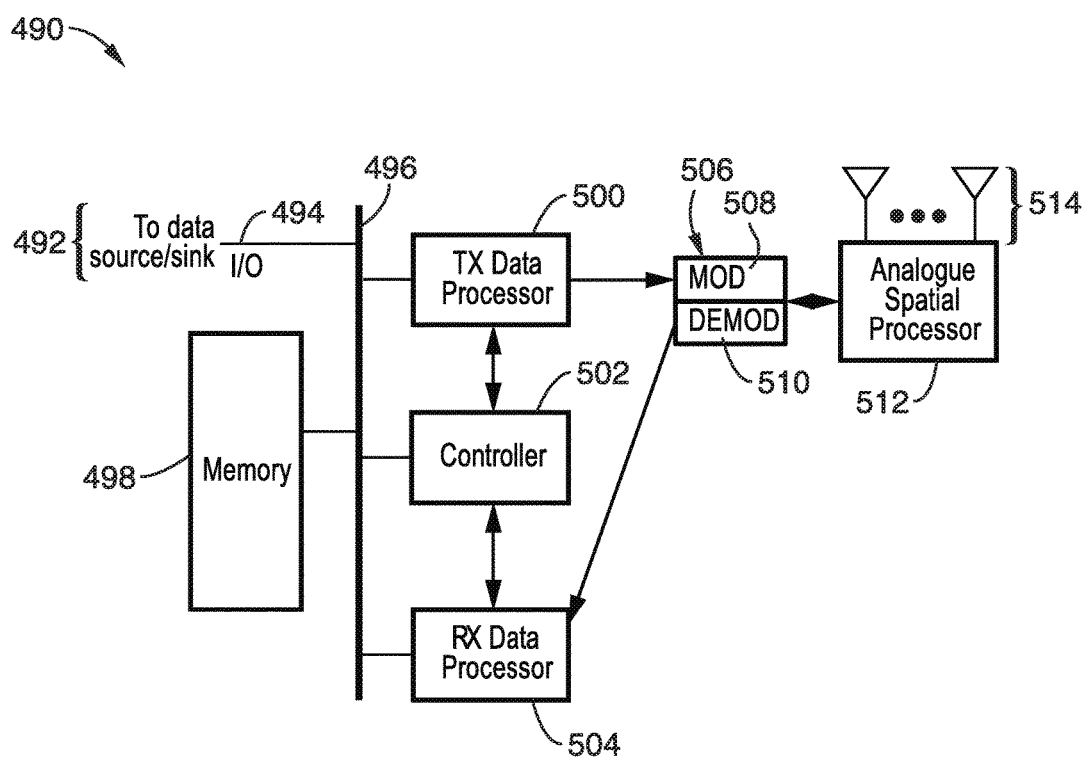
FIG. 16 is a block diagram of a single-input-single-output (SISO) station (STA) according to an embodiment of the present disclosure.

FIG. 16 illustrates an example embodiment 490 of a single-input-single-output (SISO) station (STA) configured for operation according to the present disclosure. A data line 492 is seen connecting from a source/sink device through connection 494 to a bus 496 to a memory 498, controller 502, TX data processor 500, and RX data processor 504. A modulator/demodulator (mod/demod) 506 is shown having modulator 508 and demodulator 510, and being coupled to the spatial processor 512 having antennas 514. TX data processor 500 is coupled for output through a modulator 508, while RX data processor 504 is coupled for input from a demodulator 510.

It will be noted that the controller accesses the memory and provides control signals to the TX data processor to access the bits from the data sink and perform scrambling, coding, interleaving of raw data, and mapping to data symbols or to the RX processor to de-map the received data symbols and perform deinterleaving, decoding, and descrambling operations. The modulator processes and modulates the digital symbols to analog symbols. The demodulator receives the analog symbols and demodulates to digital symbols.

When the station operates beamforming to a transmitting signal, the beam pattern to be utilized is commanded from TX data processor 500 to the modulator/demodulator 506. The modulator/demodulator interprets the given command and generates a command that is fed to analogue spatial processor 512. As a result, analogue spatial processor 512 shifts phases in each of its transmitting antenna elements to form the commanded beam pattern. When the station operates beamforming to a receiving signal, the beam pattern to be used is commanded from controller 502 and RX data processor 504 to the modulator/demodulator 506. Modulator/demodulator 506 interprets the given command and generates a command that is fed to analogue spatial processor 512. As a result, analogue spatial processor 512 shifts phases in each of its receiving antenna elements to form the commanded beam pattern. When the station receives a signal, the received signal is fed to controller 502, via analogue spatial processor 512, modulator/demodulator 506, and RX data processor 504. The controller 502 determines the content of the received signal, and triggers appropriate reactions, and stores information in memory 498 as described above. All the management frames, exchanged packets described above are determined and generated by controller 502. When a packet is to be transmitted on the air, the packet generated by the controller 502 is fed to analogue spatial processor 512 via TX data processor 500 and modulator/demodulator 506, whereas the transmitting beam pattern is controlled as described above simultaneously.

Figure 17:
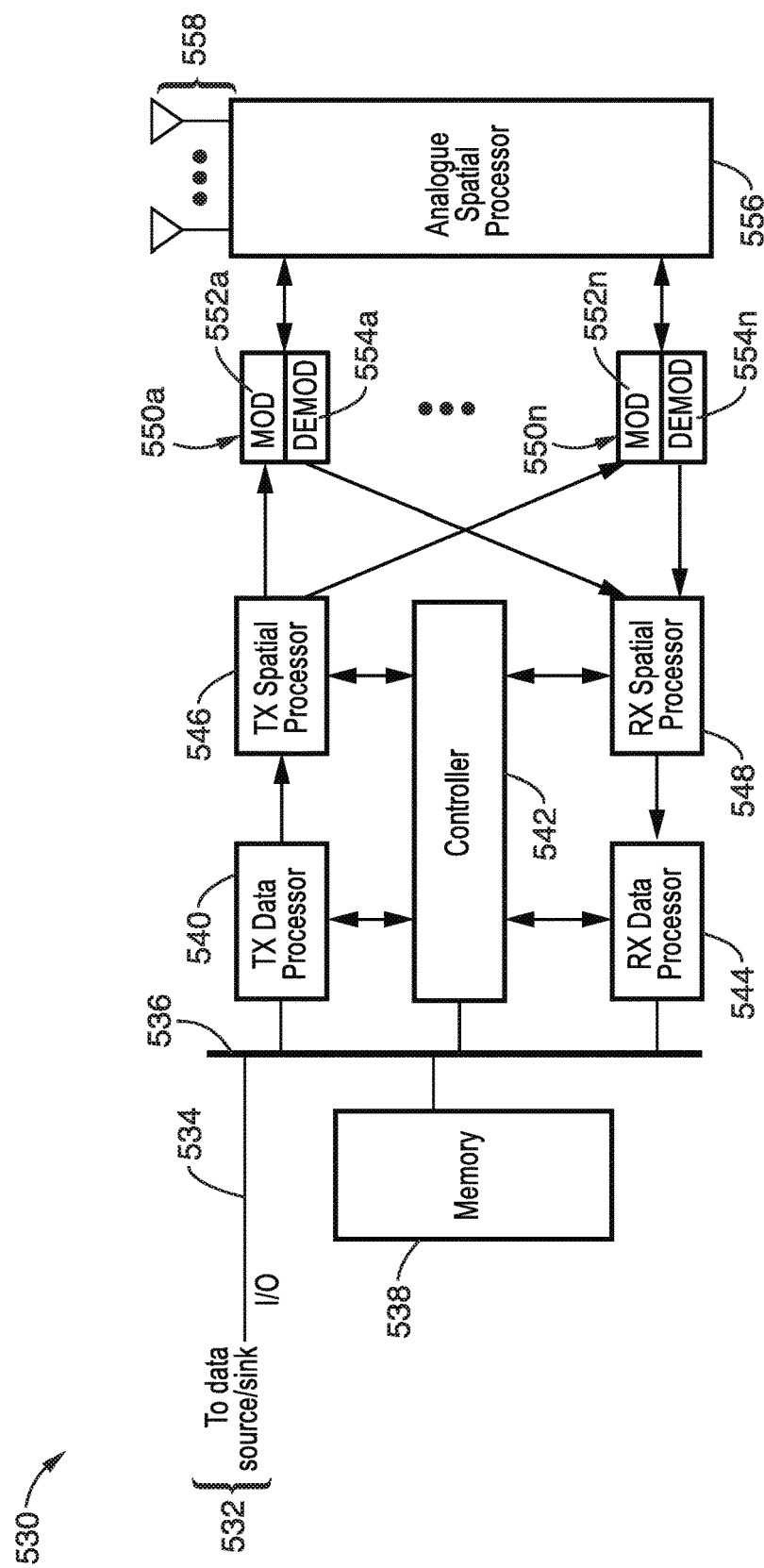
FIG. 17 is a block diagram of a single-input-single-output (MIMO) station (STA) according to an embodiment of the present disclosure.

FIG. 17 illustrates an example embodiment 530 of a multiple-input-multiple-output (MIMO) station (STA) configured for operation according to the present disclosure. It will be noted that the controller, modulators and demodulators perform the same basic functions as described for the previous embodiment. The TX spatial processor performs spatial precoding and spatial mapping of the spatial streams to match the transmit chains. The RX spatial processor performs spatial de-mapping of spatial streams received from the different receive chains and performs spatial decoding.

A data line 532 is seen connecting from a source/sink device through connection 534 to a bus 536 to a memory 538, controller 542, TX data processor 540, and RX data processor 544. In view of there being multiple inputs and outputs, TX data processor 540 couples to both the controller 542 and to a TX spatial processor 546. Similarly, RX data processor 544 couples to the controller 542, and receives data from a RX spatial processor 548. Multiple modulator/demodulator (mod/demod) devices 550a through 550n (for example two or more) are coupled to an analogue spatial processor 556, which has a plurality of antennas 558. The individual modulators 552a through 552n, of mod/demod devices 550a through 550n, receive TX inputs from TX spatial processor 546. In a similar manner the individual demodulators 554a through 554n, of mod/demod devices 550a through 550n, receive RX inputs from antenna 558 of analog spatial processor 556 which after demodulation are passed to RX spatial processor 548.

When the station operates beamforming to a transmitting signal, the beam pattern and MIMO configuration to be used are commanded from TX data processor 540 to the TX spatial processor 546 and modulator/demodulator 550a through 550n. The modulator/demodulator 550a through 550n interprets the given command and generates commands that are fed to analogue spatial processor 556. As a result, analogue spatial processor 556 shifts phases in each of its transmitting antenna elements 558 to form the commanded beam pattern and MIMO configuration. When the station operates beamforming to a receiving signal, the beam pattern for use is commanded from controller 542 and RX spatial processor 548 to the modulator/demodulator 550a through 550n. The modulator/demodulator 550a through 550n interprets the given command and generates commands that are fed to analogue spatial processor 556. As a result, analogue spatial processor 556 shifts phases in each of its receiving antenna elements to form the commanded beam pattern with MIMO configuration.

When the station receives a signal, the received signal is fed to Controller 542, via analogue spatial processor 556, modulator/demodulator 550a through 550n, and RX spatial processor 548. The controller 542 determines the content of the received signal, and triggers appropriate reactions, and stores information in memory 538 as described above. All the management frames, exchanged packets described above are determined and generated by controller 542. When a packet is to be transmitted on the air, the packet generated by the controller 542 is fed to analogue spatial processor 412 via TX data processor 540, TX spatial processor 546, and modulator/demodulator 550a through 550n, whereas the transmitting beam pattern are controlled as described above simultaneously.

The enhancements described in the presented technology can be readily implemented within various wireless communication devices. It should also be appreciated that wireless data communication devices are typically implemented to include one or more computer processor devices (e.g., CPU, microprocessor, microcontroller, computer enabled ASIC, etc.) and one or more associated memories storing instructions (e.g., RAM, DRAM, NVRAM, FLASH, computer readable media, etc.) whereby programming (instructions) stored in the memory are executed on the processor to perform the steps of the various process methods described herein.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, computer processor, central processing unit (CPU), and computer are used synonymously to denote a device capable of executing the instructions and communicating with input/output interfaces and/or peripheral devices, and that the terms processor, computer processor, CPU, and computer are intended to encompass single or multiple devices, single core and multicore devices, and variations thereof.

From the description herein, it will be appreciated that that the present disclosure encompasses multiple embodiments which include, but are not limited to, the following:

1. A wireless communication apparatus, comprising: (a) a wireless communication circuit configured for wirelessly communicating with other wireless communication stations; (b) a computer processor coupled to said wireless communication circuit; (c) a non-transitory computer-readable memory storing instructions executable by the computer processor; and (d) wherein said instructions, when executed by the computer processor, perform steps comprising: (d)(i) communicating with the other wireless communication stations utilizing a routing protocol; (d)(ii) exchanging a list of neighbor stations with neighbor stations and building a neighbor database; (d)(iii) identifying routes to a destination station within said neighbor database in response to receipt of a data stream at a source station to be sent to the destination station; (d)(iv) transmitting relay requests (RREQs) for both primary and secondary paths to be propagated by intermediate stations to the destination; (d)(v) selecting primary and secondary routes at the destination station and propagating primary and secondary responses (RREPs) to the request back through intermediate stations to the source station; and (d)(vi) transmitting data on the primary path and secondary path from the source station to the destination station.

2. The apparatus of any preceding embodiment, wherein said source station aggregates neighbor lists to discover independent primary and secondary routes to a destination STA.

3. The apparatus of any preceding embodiment, wherein intermediate stations between the source station and destination station process routing requests to assure non-overlapping primary and secondary routes.

4. The apparatus of any preceding embodiment, wherein said routing protocol is an extension of an ad-hoc on-demand distance vector (AODV) routing protocol.

5. The apparatus of any preceding embodiment, wherein said instructions when executed by the computer processor are configured for performing primary and secondary path discovery in establishing communications with a destination wireless communication station in response to utilizing extended routing request (RREQ) and routing reply (RREP) information elements sent to neighboring stations.

6. The apparatus of any preceding embodiment, wherein said instructions when executed by the computer processor are configured for utilizing said extended routing request (RREQ) and routing reply (RREP) information elements which contain a distinct extended identifier which differentiates them from a conventional (non-extended) routing request (RREQ) and routing reply (RREP), and each contain a routing flag indicating a selection between a primary routing path and a secondary routing path.

7. The apparatus of any preceding embodiment, wherein said instructions when executed by the computer processor are configured for adjusting path cost metric values in response to determining signal metrics on communications between stations.

8. The apparatus of any preceding embodiment, wherein said wireless communication circuit comprises a single-input-single-output (SISO) wireless communication circuit.

9. The apparatus of any preceding embodiment, wherein said single-input-single-output (SISO) wireless communication circuit, comprises: (a) a transmitter data processor which receives source data, processes it for transmission according to the routing protocol; (b) a modulator receiving digital output from said transmitter data processor, converting it to an analog TX signal; (c) an analog spatial processor coupled to multiple antennas, and configured for receiving said analog TX signal and coupling this to the multiple antennas for wireless transmission; (d) a demodulator receiving analog input from said analog spatial processor, converting it to a digital signal; and (e) a receiver data processor which receives digital signals from said demodulator, and generates a sink data stream for output.

10. The apparatus of any preceding embodiment, wherein said wireless communication circuit comprises a multiple-input-multiple-output (MIMO) wireless communication circuit.

11. The apparatus of any preceding embodiment, wherein said multiple-input-multiple-output (MIMO) wireless communication circuit, comprises: (a) a transmitter data processor which receives source data, processes it for transmission according to the routing protocol; (b) a transmitter spatial processor which spatially converts the output from said transmitter data processor to spatial outputs; (c) a plurality of modulators each receiving one of the spatial outputs and converting it to an analog TX signal; (d) an analog spatial processor coupled to multiple antennas, and configured for receiving said analog TX signal from each of said plurality of modulators and coupling this to the multiple antennas for wireless transmission; (e) a plurality of demodulators receiving analog input from said analog spatial processor, converting it to digital receiver signals; (f) a receiver spatial processor which receives digital receiver signals from said plurality of demodulators, and spatially processes them into a digital data output; and (g) a receiver data processor which receives digital data output from said receiver spatial processor from which it generates a sink data stream for output.

12. The apparatus of any preceding embodiment, wherein said apparatus is utilized in a communication application selected from the group of wireless communication applications consisting of: wireless local area networks (WLANs), wireless personal area networks (WPANs), wireless multiple hop relaying networks, peer-to-peer (P2P) communications, outdoor wireless communications, Wi-Fi networks, Internet of things (IoT) applications, backhauling of data by mesh networking, next generation cellular networks with D2D communications, 802.11 networks, and ZigBee.

13. A method of wireless communication, comprising: (a) communicating from a first communications station to other wireless communication stations by utilizing a routing protocol; (b) exchanging lists of neighbor stations with neighbor stations and building a neighbor database; (c) identifying routes to a desired destination within said neighbor database in response to receipt of a data stream at a source station to be sent to a destination station; (d) transmitting relay requests (RREQs) for both primary and secondary paths to be propagated by intermediate stations located between a source station and a destination station; (e) selecting primary and secondary routes at the destination station and propagating primary and secondary responses (RREPs) to the request back through intermediate stations to the source station; and (f) transmitting data on the primary path and secondary path from the source station to the destination station.

14. The method of any preceding embodiment, wherein said source station performs aggregating neighbor lists to discover independent primary and secondary routes to a destination STA.

15. The method of any preceding embodiment, wherein intermediate stations between the source station and the destination station, are configured for processing routing requests to assure non-overlapping primary and secondary routes.

16. The method of any preceding embodiment, wherein said routing protocol comprises extending an ad-hoc on-demand distance vector (AODV) routing protocol.

17. The method of any preceding embodiment, wherein said method is configured for performing primary and secondary path discovery in establishing communications with a destination wireless communication station in response to utilizing extended routing request (RREQ) and routing reply (RREP) information elements sent to neighboring stations.

18. The method of any preceding embodiment, further comprising the step of adjusting path cost metric values in response to determining signal metrics on communications between stations, toward assuring non-overlapping primary and secondary routes.

19. The method of any preceding embodiment, wherein said communication station comprises a single-input-single-output (SISO) wireless communication station.

20. The method of any preceding embodiment, wherein said communication station comprises a multiple-input-multiple-output (MIMO) wireless communication station.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

| Neighbor for STA A as seen in FIG. 14A | | |
|---|---|---|
| Neighbor STA | Neighbors | Link Quality |
| B | A, D, E | Q(ba), Q(bd), Q(be) |
| C | A, D | Q(ca), Q(cd) |
| D | A, B, C, E, F | Q(da), Q(db), Q(dc), Q(de), Q(df) |

What is claimed is:

1. A wireless communication apparatus, comprising:
   (a) a wireless communication circuit which is configured for wirelessly communicating with other wireless communication stations;
   (b) a computer processor coupled to said wireless communication circuit;
   (c) a non-transitory computer-readable memory storing instructions executable by the computer processor; and
   (d) wherein said instructions, when executed by the computer processor, perform steps comprising:
      (i) communicating with the other wireless communication stations utilizing a routing protocol;
      (ii) entering a timer based proactive phase, and (A) periodically exchanging a list of neighbor stations as neighbor lists with neighboring stations and processing and aggregating received neighbor lists for building and/or updating a neighbor database with information comprising addresses, link quality information, identifications of reliable peer stations and their link quality and (B) discovering independent primary and secondary paths to a destination station;
      (iii) entering a reactive phase triggered by the presence of data packets at the source station and identifying paths to a destination station within said neighbor database when it receives a data stream at a source station to be sent to the destination station;
      (iv) wherein identifying of paths to the destination station are determined by fetching and processing the neighbor database and determining that at least two multiple hop paths exist to the destination, following by ranking the paths to the destination with the highest ranked path selected as the primary path and the second highest ranked path designated as the secondary path;
      (v) transmitting relay requests (RREQs) for both primary and secondary paths to be propagated by intermediate stations to the destination, wherein said RREQs for both the primary and secondary paths are transmitted without regard to awaiting a response from other stations;
      (vi) selecting primary and secondary routes at the destination station and propagating primary and secondary responses (RREPs) to the request back through intermediate stations to the source station; and
      (vii) transmitting data on the primary path and secondary path from the source station to the destination station.

2. The apparatus of claim 1, wherein intermediate stations between the source station and destination station process routing requests to assure non-overlapping primary and secondary routes.

3. The apparatus of claim 1, wherein said routing protocol is an extension of an ad-hoc on-demand distance vector (AODV) routing protocol.

4. The apparatus of claim 1, wherein said instructions when executed by the computer processor are configured for performing primary and secondary path discovery in establishing communications with a destination wireless communication station in response to utilizing extended routing request (RREQ) and routing reply (RREP) information elements sent to neighboring stations.

5. The apparatus of claim 4, wherein said instructions when executed by the computer processor are configured for utilizing said extended routing request (RREQ) and routing reply (RREP) information elements which contain a distinct extended identifier which differentiates them from a conventional (non-extended) routing request (RREQ) and routing reply (RREP), and each contain a routing flag indicating a selection between a primary routing path and a secondary routing path.

6. The apparatus of claim 1, wherein said instructions when executed by the computer processor are configured for adjusting path cost metric values in response to determining signal metrics on communications between stations.

7. The apparatus of claim 1, wherein said apparatus is utilized in a communication application selected from the group of wireless communication applications consisting of: wireless local area networks (WLANs), wireless personal area networks (WPANs), wireless multiple hop relaying networks, peer-to-peer (P2P) communications, outdoor wireless communications, Wi-Fi networks, Internet of things (IoT) applications, backhauling of data by mesh networking, next generation cellular networks with D2D communications, 802.11 networks, and ZigBee.

8. The apparatus of claim 1, wherein said wireless communication circuit comprises a single-input-single-output (SISO) wireless communication circuit.

9. The apparatus of claim 8, wherein said single-input-single-output (SISO) wireless communication circuit, comprises:

(a) a transmitter data processor which receives source data, processes it for transmission according to the routing protocol;
(b) a modulator receiving digital output from said transmitter data processor, converting it to an analog TX signal;
(c) an analog spatial processor coupled to multiple antennas, and configured for receiving said analog TX signal and coupling this to the multiple antennas for wireless transmission;
(d) a demodulator receiving analog input from said analog spatial processor, converting it to a digital signal; and
(e) a receiver data processor which receives digital signals from said demodulator, and generates a sink data stream for output.

10. The apparatus of claim 1, wherein said wireless communication circuit comprises a multiple-input-multiple-output (MIMO) wireless communication circuit.

11. The apparatus of claim 10, wherein said multiple-input-multiple-output (MIMO) wireless communication circuit, comprises:
(a) a transmitter data processor which receives source data, processes it for transmission according to the routing protocol;
(b) a transmitter spatial processor which spatially converts the output from said transmitter data processor to spatial outputs;
(c) a plurality of modulators each receiving one of the spatial outputs and converting it to an analog TX signal;
(d) an analog spatial processor coupled to multiple antennas, and configured for receiving said analog TX signal from each of said plurality of modulators and coupling this to the multiple antennas for wireless transmission;
(e) a plurality of demodulators receiving analog input from said analog spatial processor, converting it to digital receiver signals;
(f) a receiver spatial processor which receives digital receiver signals from said plurality of demodulators, and spatially processes them into a digital data output; and
(g) a receiver data processor which receives digital data output from said receiver spatial processor from which it generates a sink data stream for output.

12. A method of wireless communication, comprising:
(a) communicating from a first communications station to other wireless communication stations by utilizing a routing protocol;
(b) wherein said first communication station and each of said other wireless communication stations comprise either: a single-input-single-output (SISO) wireless communication station, or a multiple-input-multiple-output (MIMO) wireless communication station;
(c) entering a timer based proactive phase, and (A) periodically exchanging lists of neighbor stations as neighbor lists with neighboring stations and processing and aggregating received neighbor lists for building and/or updating a neighbor database with information comprising addresses, link quality information, identifications of reliable peer stations and their link quality and (B) discovering independent primary and secondary paths to a destination station;
(d) entering a reactive phase triggered by the presence of data packets at the source station and identifying paths to a desired destination within said neighbor database when it receives a data stream at a source station to be sent to a destination station;
(e) wherein identifying of paths to the destination station are determined by fetching and processing the neighbor database and determining that at least two multiple hop paths exist to the destination, following by ranking the paths to the destination with the highest ranked path selected as the primary path and the second highest ranked path designated as the secondary path;
(f) transmitting relay requests (RREQs) for both primary and secondary paths to be propagated by intermediate stations located between a source station and a destination station wherein said RREQs for both the primary and secondary paths are transmitted without regard to awaiting a response from other stations;
(g) selecting primary and secondary routes at the destination station and propagating primary and secondary responses (RREPs) to the request back through intermediate stations to the source station; and
(h) transmitting data on the primary path and secondary path from the source station to the destination station;
(i) wherein said single-input-single-output (SISO) wireless communication circuit, comprises: (i) a transmitter data processor which receives source data, processes it for transmission according to the routing protocol; (ii) a modulator receiving digital output from said transmitter data processor, converting it to an analog TX signal; (iii) an analog spatial processor coupled to multiple antennas, and configured for receiving said analog TX signal and coupling this to the multiple antennas for wireless transmission; (iv) a demodulator receiving analog input from said analog spatial processor, converting it to a digital signal; and (v) a receiver data processor which receives digital signals from said demodulator, and generates a sink data stream for output; and
(k) wherein multiple-input-multiple-output (MIMO) wireless communication circuit comprises (i) a transmitter data processor which receives source data, processes it for transmission according to the routing protocol; (ii) a transmitter spatial processor which spatially converts the output from said transmitter data processor to spatial outputs; (iii) a plurality of modulators each receiving one of the spatial outputs and converting it to an analog TX signal; (iv) an analog spatial processor coupled to multiple antennas, and configured for receiving said analog TX signal from each of said plurality of modulators and coupling this to the multiple antennas for wireless transmission; (v) a plurality of demodulators receiving analog input from said analog spatial processor, converting it to digital receiver signals; (vi) a receiver spatial processor which receives digital receiver signals from said plurality of demodulators, and spatially processes them into a digital data output; and (vii) a receiver data processor which receives digital data output from said receiver spatial processor from which it generates a sink data stream for output.

13. The method of claim 12, wherein intermediate stations between the source station and the destination station, are configured for processing routing requests to assure non-overlapping primary and secondary routes.

14. The method of claim 12, wherein said routing protocol comprises extending an ad-hoc on-demand distance vector (AODV) routing protocol.

15. The method of claim 12, wherein said method is configured for performing primary and secondary path discovery in establishing communications with a destination wireless communication station in response to utilizing extended routing request (RREQ) and routing reply (RREP) information elements sent to neighboring stations.

16. The method of claim 12, further comprising the step of adjusting path cost metric values in response to determining signal metrics on communications between stations, toward assuring non-overlapping primary and secondary routes.

* * * * *